US012711818B2

(12) United States Patent
Yousefi et al.

(10) Patent No.: US 12,711,818 B2
(45) Date of Patent: Aug. 18, 2026

(54) MANAGING STATE OF HEALTH AND REMAINING USEFUL LIFE REGARDING A VEHICLE

(71) Applicant: Atieva, Inc., Newark, CA (US)

(72) Inventors: Nima Yousefi, Oakland, CA (US); Fernando Martinez Castillo, Fremont, CA (US); Kip Andrew Molchan, Redwood City, CA (US); Giso Mascher, Fremont, CA (US)

(73) Assignee: Atieva, Inc., Newark, CA (US)

( * ) Notice: Subject to any disclaimer, the term of this patent is extended or adjusted under 35 U.S.C. 154(b) by 95 days.

(21) Appl. No.: 18/784,129

(22) Filed: Jul. 25, 2024

(65) Prior Publication Data

US 2026/0030938 A1 Jan. 29, 2026

(51) Int. Cl.
*G07C 5/08* (2006.01)
*G07C 5/12* (2006.01)

(52) U.S. Cl.
CPC ............ *G07C 5/0808* (2013.01); *G07C 5/12* (2013.01)

(58) Field of Classification Search
CPC ................................ G07C 5/0808; G07C 5/12
See application file for complete search history.

(56) References Cited

U.S. PATENT DOCUMENTS 9,463,700 B2 10/2016 Liu
10,447,195 B2 10/2019 Tang
10,964,130 B1 * 3/2021 Dixit .................. G05B 23/0283
2014/0269831 A1 9/2014 Tang
2016/0065113 A1 3/2016 Gauthier
2019/0389599 A1 12/2019 Dillard et al.
2021/0284179 A1 * 9/2021 Diamond ............... G06N 3/084
2024/0176341 A1 5/2024 Mckinley et al.

FOREIGN PATENT DOCUMENTS

EP 4307068 A1 1/2024

OTHER PUBLICATIONS

Bhatti, G. et al.: "Towards the future of smart electric vehicles: Digital twin technology," Renewable and Sustainable Energy Reviews, vol. 141, Feb. 2021, 18 pages.
Garrett Advancing Motion: "Future of Vehicle Health Management With Sae JA6268™," May 4, 2021, 33 pages.
(Continued)

*Primary Examiner* — Michael V Kerrigan
(74) *Attorney, Agent, or Firm* — Brake Hughes Bellermann LLP

(57) ABSTRACT

A method comprises: receiving data generated by at least one sensor of a vehicle arranged to generate the data regarding at least one first component of the vehicle; providing the data to at least one failure mode component associated with the at least one first component and configured to determine a likelihood that a condition exists with regard to the at least one first component; quantifying, based on the likelihood, a first state of at least one first system of the vehicle, the first system including the at least one first component; performing, based on the first state, a prognostication that indicates i) a SOH for the at least one first system, and ii) a RUL for the at least one first system; and performing, based at least in part on the SOH and the RUL, at least one action with regard to the vehicle.

16 Claims, 19 Drawing Sheets

(56) References Cited

OTHER PUBLICATIONS

Klesing, J. et al.: “New Approaches to Vehicle Health Management via a Digital Twin,” P. Pfeffer (ed.): 12th International Munich Chassis Symposium 2021, Proceedings, 2022, pp. 200-217.
SAE International: “Integrated Vehicle Health Management: IVHM Capability Levels are Defined in SAE International Recommended Practice JA6268,” Apr. 2, 2018, 3 pages.
Tao, X. “Application of Integrated Vehicle Health Management in Automated Decision-making for Driverless Vehicles,” Doctoral Thesis in Machine Design, KTH Royal Institute of Technology, May 29, 2023, 77 pages.
Wang, C et al.: “Prognostics and Health Management System for Electric Vehicles with a Hierarchy Fusion Framework: Concepts, Architectures, and Methods,” Hindawi, Advances in Civil Engineering, vol. 2021, Article ID 6685900, Jan. 2021, 11 pages.
Wang, S.: “Health State Assessment of Industrial Equipment Driven by the Fusion of Digital Twin Model and Intelligent Algorithm,” Hindawi, Computational Intelligence and Neuroscience, vol. 2022, Article ID 7324121, Aug. 2022, 12 pages.
Wikipedia, “Actuarial science,” available online at <https://en.wikipedia.org/w/index.php?title=Actuarial_science&oldid=1152183377> Apr. 28, 2023, 10 pages.
Wikipedia, “Fault tree analysis,” available online at <https://en.wikipedia.org/w/index.php?title=Fault_tree_analysis&oldid=1158158152> Jun. 2, 2023, 12 pages.
Wikipedia, “Prognostics,” available online at <https://en.wikipedia.org/w/index.php?title=Prognostics&oldid=1137640498> Feb. 5, 2023, 9 pages.
International Search Report and Written Opinion for PCT Application No. PCT/US2025/037348, mailed on Oct. 28, 2025, 15 pages.

* cited by examiner

1300

Lowest Health Member by [Component] ▾

1302

| Fleet | Component ▾ | AVG Health ▾ | Health$^{50}$ Alerts |
|---|---|---|---|
| Europe | Cooling Pump | 82% | 34 |
| N AMERICA | Rear Drive Differential | 90% | 76 |
| N AMERICA | DCDC Convertor | 95% | 37 |

Lowest RUL Member by [System] ▾

1304

| Fleet | Sub-System ▾ | AVG RUL% ▾ | RUL$^{30}$ Alerts |
|---|---|---|---|
| N AMERICA | Rear Drive Unit | 86% | 11 |
| Europe | Cooling System | 88% | 19 |
| Europe | MPB | 91% | 8 |

Lowest Health$^{25}$ Vins and the Responsible Member

1306

| VIN | Responsible Assembly ▾ | Health$^{25}$ ▾ | RUL ▾ |
|---|---|---|---|
| 54e1224328dsjh1 | Lubrication System | 23% | 55d |
| 56e1224328dsjh2 | Cooling System | 22% | 36d |
| 54e1224328dsjh3 | HV Pack Isolation | 22% | 42d |
| 55e1224328dsjh4 | Motor | 21% | 75d |
| 54e1224328dsjh5 | Differential | 21% | 105d |
| 53e1224328dsjh6 | MPB | 20% | 35d |
| 54e1224328dsjh7 | Inverter | 20% | 37d |
| 53e1224328dsjh8 | Motor | 20% | 28d |

FIG. 13A

| VIN | Responsible Assembly▾ | RUL30▾ | Health▾ |
|---|---|---|---|
| 54e1224328dsjh1 | Lubrication System | 29d | 41% |
| 56e1224328dsjh2 | Cooling System | 29d | 30% |
| 54e1224328dsjh3 | HV Pack Isolation | 29d | 37% |
| 53e1224328dsjh8 | Motor | 28d | 20% |
| 55e1224328dsjh5 | Differential | 28d | 21% |
| 53e1224328dsjh6 | Power | 28d | 20% |
| 54e1224328dsjh7 | Inverter | 27d | 20% |
| 53e1224328dsjh8 | Motor | 27d | 20% |
| 53e1224328dsjh9 | Cooling System | 27d | 18% |
| 53e1224328dsjh10 | Cooling System | 21d | 15% |
| 53e1224328dsjh11 | HV Pack Cell | 20d | 17% |
| 53e1224328dsjh12 | Cooling System | 18d | 21% |

MANAGING STATE OF HEALTH AND REMAINING USEFUL LIFE REGARDING A VEHICLE

TECHNICAL FIELD

This disclosure relates to managing state of health and remaining useful life regarding a vehicle.

BACKGROUND

The currently ongoing shift in the automotive industry toward vehicles driven by electric motors has significantly reduced the amount of service and repair necessary to keep a vehicle in working order. Nevertheless, due to normal wear and tear, and/or extreme use or other conditions, deterioration does occur and can result in decreased functionality or ultimately breakdown.

SUMMARY

In a first aspect, a method comprises: receiving, by at least one processor that performs operations by executing instructions, data generated by at least one sensor of a vehicle, the at least one sensor arranged to generate the data regarding at least one first component of the vehicle; providing, by the at least one processor, the data to at least one failure mode component associated with the at least one first component, the at least one failure mode component configured to determine a likelihood that a condition exists with regard to the at least one first component; quantifying, by the at least one processor and based at least in part on the likelihood, a first state of at least one first system of the vehicle, the at least one first system including the at least one first component; performing, by the at least one processor and based at least in part on the first state, a prognostication that indicates i) a state of health (SOH) for the at least one first system, and ii) a remaining useful life (RUL) for the at least one first system; and performing, by the at least one processor and based at least in part on the SOH and the RUL, at least one action with regard to the vehicle.

Implementations can include any or all of the following features. The at least one first component of the vehicle has multiple sensors and wherein the data is generated by the multiple sensors. The at least one first component has multiple failure mode components associated with respective conditions, wherein each of the multiple failure mode components determines a corresponding likelihood that the respective condition exists, and wherein the SOH and RUL are based on at least some of the corresponding likelihoods. At least one second system of the vehicle includes the at least one first system, the method further comprising quantifying, by the at least one processor and based at least in part on the likelihood, a second state of at least one second system. Performing the prognostication is based at least in part also on the second state. Performing the at least one action is based at least in part also on the second state. The at least one second system corresponds to the vehicle. Performing the at least one action comprises specifying a maintenance opportunity for the vehicle. The method further comprises extending, after performance of maintenance corresponding to the maintenance opportunity, at least one threshold for the vehicle, the at least one threshold relating to at least one of the SOH or the RUL. Specifying the maintenance opportunity comprises selecting a length of time for initiating the maintenance opportunity. Performing the at least one action comprises presenting information in a graphical user interface, the information based on the SOH and the RUL. The information is specific to the vehicle. The information relates to a fleet of vehicles, the fleet including the vehicle. The graphical user interface is configured for performing a drilldown using the information to seek a root cause relating to vehicle health. Performing the at least one action comprises notifying a service provider about vehicle maintenance. Performing the at least one action comprises notifying an operator of the vehicle. The method is performed using multiple processors, wherein at least one of the multiple processors is located onboard the vehicle, and wherein at least another one of the multiple processors is located in a cloud separate from the vehicle.

In a second aspect, a system comprises: a data interface to receive data generated by at least one sensor of a vehicle, the at least one sensor arranged to generate the data regarding at least one first component of the vehicle; a decision support runtime engine, implemented using at least one processor that performs operations by executing instructions, the decision support runtime engine to determine, with regard to the vehicle and based at least in part on the data, i) a state of health (SOH) for at least one first system of the vehicle that includes the at least one first component, and ii) a remaining useful life (RUL) for the at least one first system; and a component to perform, based at least in part on the SOH and the RUL, at least one action with regard to the vehicle.

Implementations can include any or all of the following features. An entirety of the system is implemented onboard the vehicle. A portion of the system is implemented onboard the vehicle, and wherein a remaining portion of the system is implemented in a cloud separate from the vehicle. An entirety of the system is implemented in a cloud separate from the vehicle, and wherein the system receives the data generated by the at least one sensor by a wireless communication sent from the vehicle to the cloud.

BRIEF DESCRIPTION OF DRAWINGS

FIGS. 13A-13B show an example of information that can be included in the presentation of FIG. 12.

Like reference symbols in the various drawings indicate like elements.

DETAILED DESCRIPTION

Figure 1:
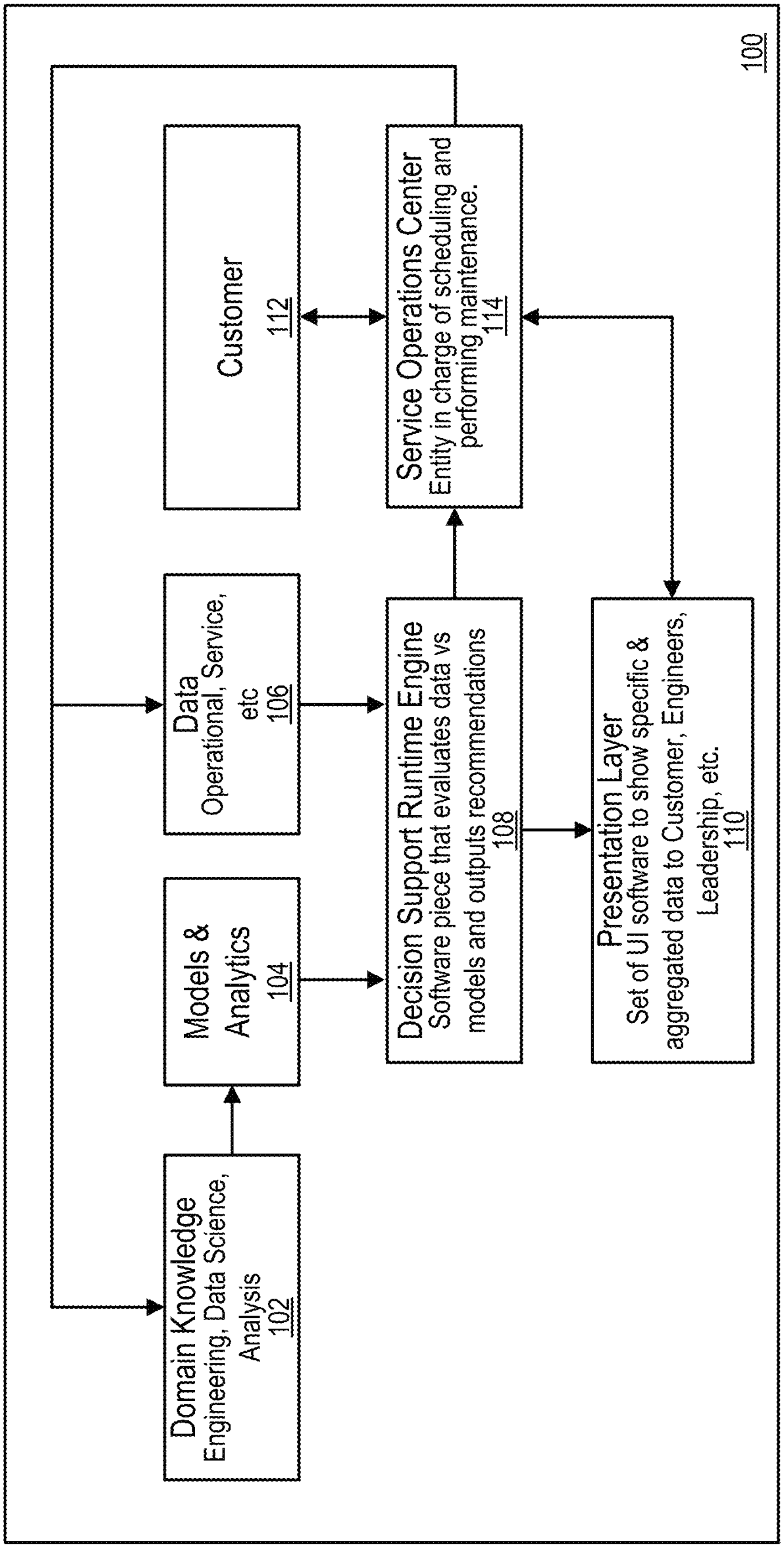
FIG. 1 shows an example of a development and deployment framework for a health management system for a vehicle.

This document describes examples of systems and techniques that manage a state of health (SOH) and a remaining useful life (RUL) regarding a vehicle. For example, this can involve making an assessment on the current SOH of the vehicle, predicting the future SOH, and projecting it to estimate the RUL of the vehicle and its systems. An implementation can provide a system that diagnoses the onset of component failure, estimates the current and future SOH, and aggregates that information to generate insight and predict the reliability horizon of the vehicle. This information can then be further processed to generate predictive and prescriptive maintenance advisories. Some implementations involve electric vehicles, with which significant complexity comes from the software driven architecture and challenges of the model inaccuracies. The present subject matter can provide "health modeling" as a way of quantifying the difference between the non-compromising digital twin of the asset and its "current" health, rather than its performance output, which is regulated and tuned by various control algorithms. In some implementations, a health management system is provided for a vehicle (e.g., an electric vehicle) that includes: (i) a data pipeline, (ii) analytics engines corresponding to a health manager and a maintenance manager, (iii) an information aggregation framework, (iv) a decision support system, and (v) a presentation layer. A health management system for a vehicle can provide a unified capability of assessing the current or future state of the member systems' health and integrate that picture of system health within a framework of available resources and operational demand. Architecture, algorithms, and methods of communication are exemplified herein for detection of the onset of a failure, quantification of the degree of damage, prognosis of the failure mode, and its propagation within a vehicle. Using the quantified SOH and prediction of the system level failure horizon (e.g., RUL), along with information about maintenance resources and part logistics, predictive and prescriptive maintenance activity can be scheduled and executed.

As part of a health management system a framework can be established, tools can be developed and validated, and technologies and techniques can be provided for automated detection, diagnosis and prognosis that enables mitigation of adverse events prior and during vehicle operation. Adverse events can include those that arise from system, subsystem, or component faults or failures due to damage, degradation, or environmental hazards that occur during operation. Risk can be quantified and mitigated risk with metrics including at least the SOH and the RUL. These measures can have a direct relationship with asset reliability, safety and performance. Under this premise, vehicle health can be an aggregate of all systems' health, and can serve as a representation of its reliability, overall condition and performance level.

A health management system can include a collection of software components responsible for managing the integrity of other system components (member systems) during operation (on-line) and/or when the system is in an idle state (offline). Fault detection, diagnosis, and prognosis can be performed to improve or optimize system performance by anticipating countermeasures in case of failures, also known as recovery protocols, or enhancing maintenance scheduling (via condition-based or predictive maintenance), thereby minimizing unplanned downtime, ensuring adequate inventory, and product life extension.

The present subject matter can provide insights that help prepare for and reduce the amount of vehicle downtime, improve the customer experience and save on logistics and service costs. Modern electric vehicles prioritize professional maintenance over do-it-yourself repairs, requiring special tools and trained technicians. Regular electric vehicle owners often cannot easily service their vehicles, and service centers then offer valuable expertise. Health management is important for critical systems like electric motors and battery packs. It may be a design requirement for autonomous driving and advanced driving assist (Level 3 and above) to ensure vehicle safety under all conditions, including unforeseen ones. Autonomous driving systems require online diagnostics to quickly address anomalies, preserving safety and continuous operation.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels is used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples described herein refer to an advanced driver assistance system (ADAS). Assisted driving involves at least partially automating one or more dynamic driving tasks by way of computer-based operations (e.g., by a processor executing instructions). An ADAS can perform assisted driving and is an example of an assisted-driving system. Assisted driving is performed based in part on the output of one or more sensors typically positioned on, under, or within the vehicle, which is sometimes referred to as the ego vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking. As used herein, an ADAS controller is a processor-based device that performs one or more ADAS functions in a vehicle. For example, the ADAS controller can be referred to as an electronic control unit (ECU) of the vehicle.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., a light ranging and detection (LiDAR) device); a radio-based sensor (e.g., radar); an acoustic sensor (e.g., an ultrasonic device and/or a microphone); an inertial measurement unit (IMU) (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a thermal sensor; a temperature sensor (e.g., a primary or secondary thermometer); a pressure sensor (e.g., for ambient air or a component of the vehicle); a humidity sensor (e.g., a rain detector); or a seat occupancy sensor.

Examples described herein refer to a SOH. As used herein, a SOH is a quantified assessment that reflects an estimation of the vehicle's health in relation to some standard. In some implementations, a SOH can be numerically quantified as a number within a range. One end of the range can correspond to full health, and an opposite end of the range can correspond to a state where no health exists (e.g., when a component, assembly or system is no longer able to operate in a useful manner). For example, SOH can be quantified (e.g., for a particular component, assembly or system) as a number in the range 0-100%.

Examples described herein refer to a RUL. As used herein, a RUL is a quantified assessment that reflects a prognosis of the length of time that the vehicle can continue to be operated until its health reaches a state where operation of the particular component, assembly or system in a useful manner is no longer possible. In some implementations, a RUL can be numerically quantified as a length of time. The time can be measure using any unit of time, including, but not limited to, a number of days.

FIG. 1 shows an example of a development and deployment framework for a health management system for a vehicle. A framework 100 illustrates examples of the development of a health management system and how the health management system may be deployed. The framework 100 can be used with one or more other examples described elsewhere herein. The framework 100 can be implemented using some or all components described below with reference to FIG. 18.

The framework 100 includes domain knowledge 102. The domain knowledge 102 represents information, know-how or other knowledge relating to the type(s) of vehicle for which health is to be managed. For example, the domain knowledge 102 can include engineering knowledge (e.g., by engineers who developed the vehicle), data science knowledge (e.g., how to model complex systems and their behaviors, and perform prognostication with regard to the future behavior of such systems), and analysis information (e.g., assessments of past behaviors to evaluate scenarios and infer possible consequences of events).

The framework 100 includes models and analytics 104. The models and analytics 104 have been created to be a faithful computer-based representation of components and systems that make up a vehicle, and to reflect their respective possible behaviors over time.

The framework 100 includes data 106. The data 106 can include any information that is relevant to making an assessment of SOH and/or RUL. In some implementations, the data 106 includes outputs (e.g., signals) generated by one or more sensors of the vehicle. In some implementations, the data 106 includes service information regarding the vehicle. For example, when a component or system of the vehicle has been repaired or replaced, that information can be included in the data 106.

The framework 100 includes a decision support runtime engine 108. The decision support runtime engine 108 can evaluate some or all of the data 106 regarding one or more of the models of the models and analytics 104. In some implementations, this evaluation can allow the decision support runtime engine 108 to perform one or more actions relating to vehicle health. For example, the decision support runtime engine 108 issues one or more recommendations.

The decision support runtime engine 108 can generate output to one or more other aspects of the framework 100. In some implementations, a presentation layer 110 can output one or more kinds of information based on the evaluation performed by the decision support runtime engine 108. The presentation layer 110 can include a graphical user interface (GUI). For example, the GUI can present specific and aggregated data to a customer 112 of the vehicle, to an engineer, and/or to leadership of the service/maintenance organization for the vehicle. That is, the decision support runtime engine 108 can perform one or more actions by presenting information regarding vehicle health in a GUI, the information based on SOH and RUL.

In some implementations, the evaluation performed by the decision support runtime engine 108 can be the basis for one or more communications to a service operations center 114. The service operations center 114 can be part of the organization of the vehicle manufacturer or can be a separate service provider for the vehicle. The service operations center 114 can be an entity in charge of scheduling and performing maintenance on the vehicle. For example, the decision support runtime engine 108 can inform the service operations center 114 when service is likely to be needed and/or what components or systems are implicated.

Figure 2:
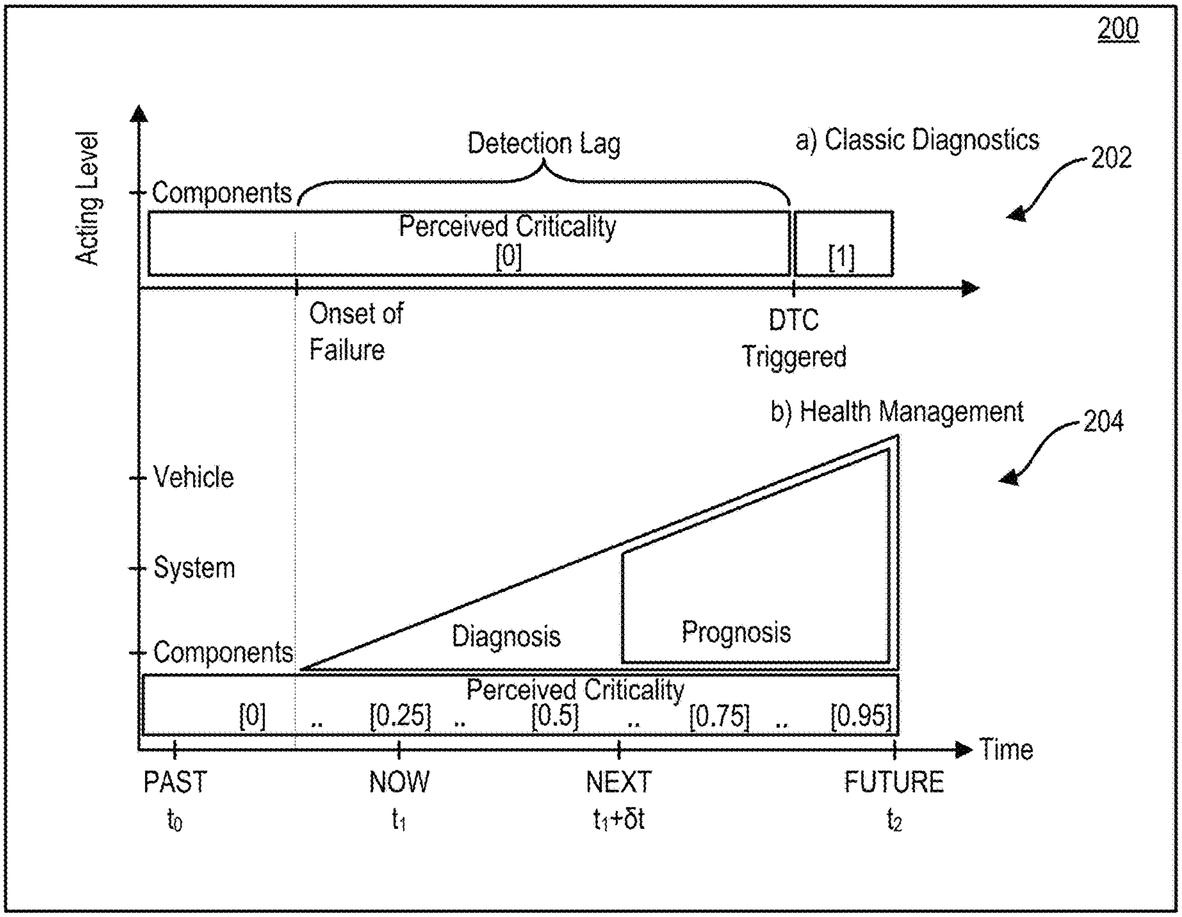
FIG. 2 shows a diagram that illustrates an aspect of traditional automotive diagnostics, and an example of the present subject matter.

FIG. 2 shows a diagram 200 that illustrates an aspect of traditional automotive diagnostics, and an example of the present subject matter. The diagram 200 can reflect one or more other examples described elsewhere herein. The diagram 200 shows on a vertical axis an acting level and on a horizontal axis the passage of time.

A graph 202 in the diagram 200 is characterized as classical diagnostics and corresponds to an approach used before the present subject matter. For example, classical diagnostics oftentimes does not actually diagnose an issue; rather, it detects that an issue has occurred somewhere in the system. Much work in the area of fault diagnosis in automotive systems has been focused on offline diagnostics performed by service technicians or mechanics in the field. For example, this has been done through diagnostic trouble codes (DTC), often to discover which parts need to be replaced and/or sent back for repair or warranty claims. In the graph 202, an onset of failure is indicated on the horizontal axis. These tools have a detection lag and are only triggered at the definitive point of failure (here labeled "DTC triggered"). This means that a binary value is assigned to the perceived criticality of failure that indicates component failure has happened. For example, the perceived criticality is initially zero (e.g., no fault is present, and therefore not critical) and instantly increases to a value of one (e.g., a fault is present, and therefore critical).

A graph 204 in the diagram 200 reflects an example involving the present subject matter. Here, the failure mode can be tracked from its conception at the component level. Diagnosis occurs mostly at the component level, but is intended to roll-over to higher levels of hierarchy: system level and onward to the vehicle level. As a result, a prediction on how it is going to evolve over time can be generated. Prediction is made once there is enough data to establish the diagnosis, hence the prognosis is demonstrated with some delay. Here, examples of time instances are indicated: past ($t_0$), now ($t_1$), next ($t_1+\delta t$), and future ($t_2$). The graph 204 indicates that diagnosis is performed (e.g., diagnosis can be performed continuously) and that prognosis can be performed based on the diagnosis that is available at each time instance. The graph 204 illustrates that due to the diagnosis and prognosis the perceived criticality can gradually increase from zero to higher values. That is, the instant increase is avoided.

Figure 3:
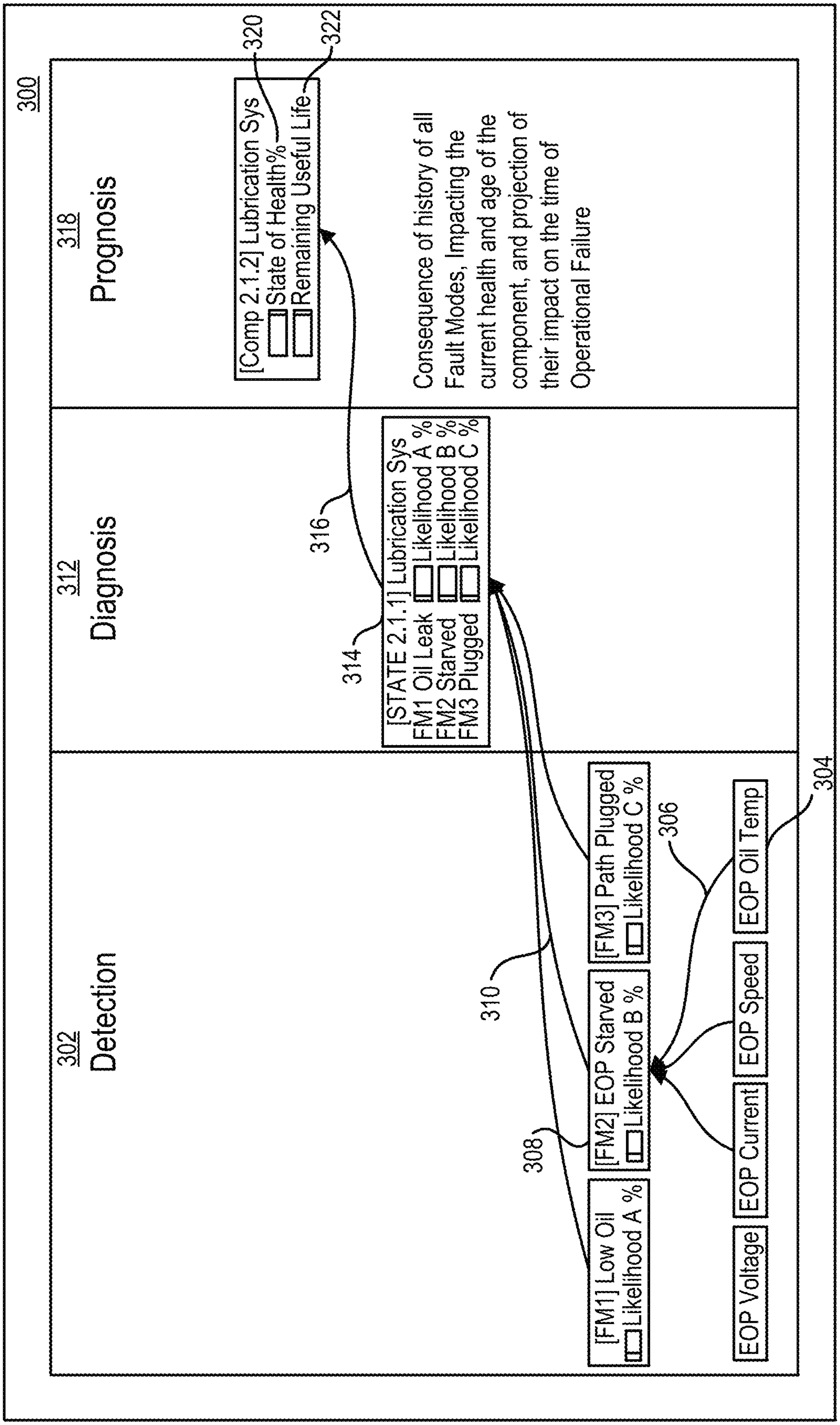
FIG. 3 shows an example of a sequence for component level detection, diagnosis and prognosis.

FIG. 3 shows an example of a sequence 300 for component level detection, diagnosis and prognosis. The sequence 300 can reflect one or more other examples described elsewhere herein. The sequence 300 is schematically illustrated and can be implemented using some or all components exemplified below with reference to FIG. 18.

The sequence 300 illustrates health management that can be performed with regard to a vehicle, or a system that is included in the vehicle. The sequence 300 involves a detection layer 302. In the detection layer 302, one or more sensors 304 can generate output. Each of the sensors 304 can be assigned to a component, assembly or system of a vehicle. Any component, assembly or system can have one or more instances of the sensor 304. Here, as an example, the sensors 304 that are shown are dedicated to an electric oil pump (EOP) of the vehicle. In some implementations, the EOP can be characterized as one of multiple "lowest replaceable units" (LRUs) of the vehicle, meaning that the EOP sits at a lowest level of the asset hierarchy. The LRU cannot be repaired and therefore must be replaced upon failure. Each sensor can measure any aspect relating to its component, assembly or system. Here, the sensors 304 measure the voltage of the EOP, the current of the EOP, the speed of the EOP, and the oil temperature of the EOP, respectively. Other characteristics can be monitored. Each of the sensors 304 generates a signal 306 with the output of that sensor. Any of the signals 306 can be continuous or intermittent (e.g., periodic outputs). That is, the signals 306 include data (sometimes referred to as telemetry data of the vehicle) reflecting the output of the respective one of the sensors 304.

The detection layer 302 includes one or more failure mode components 308 that relate to the sensors 304. The failure mode components 308 are here labeled FM1, FM2 and FM3, respectively. For example, FM1 can relate to a condition of low oil in the EOP, the FM2 can relate to a condition of oil starvation in the EOP, and the FM3 can relate to a condition of an oil path withing the lubrication system being plugged.

Each of the failure mode components 308 can receive one or more (e.g., all) of the signals 306. Each of the failure mode components 308 includes executable instructions (e.g., software and/or firmware) relating to detecting one or more failure modes. The failure mode components 308 can be implemented using instructions stored in a non-transitory medium, the instructions causing one or more processors to perform operations determining a likelihood that one or more conditions associated with the respective failure mode component 308 currently exists. For example, the FM1 can determine the likelihood that a condition of low oil in the EOP currently exists, the FM2 can determine the likelihood that a condition of oil starvation in the EOP currently exists, and the FM3 can determine the likelihood that a condition of an oil path from the EOP being plugged currently exists. The likelihoods determined by the FM1, FM2 and FM3 in this example are schematically illustrated in the drawing as likelihood A, B and C, respectively. The failure mode components 308 can determine their respective likelihoods based on modeling of circumstances relating to the component, assembly or system of the relevant one(s) of the sensors 304. For example, the modeling can associate respective likelihoods of low oil or oil starvation or path plugged to respective values of (or respective combinations of the values of) the signals 306 or to the absence of a signal. Each of the failure mode components 308 generates an output 310 indicating the determined likelihood(s).

The sequence 300 involves a diagnosis layer 312. In the diagnosis layer 312, a state of at least one system is quantified. In this example, the system is a lubrication system of a vehicle. The lubrication system includes, but is not limited to, the EOP mentioned above. Therefore, the modeling on which the sequence 300 is in part based reflects that the health of the lubrication system to some extent depends on the health of the EOP. The diagnosis layer 312 receives the outputs 310 of the failure mode components 308. Based on the outputs 310, the diagnosis layer 312 quantifies a state 314 of a system (here, the lubrication system) of the vehicle. For example, the state here reflects that there is a likelihood A of an oil leak, a likelihood B of oil starvation, and a likelihood C of a plugged path. The diagnosis layer 312 outputs a rate of degradation 316 that reflects the diagnosed health. Depending on the likelihood % for each of the failure modes (FMs), it will be a compound rate of degradation (dr). For example, with FM1: 5%, FM2: 95%, FM3: 40%, it can be dr1=0.000001, dr2=0.00005, dr3=0.000025, turns into dr_total=0.000076, assuming equal weights.

The sequence 300 involves a prognosis layer 318. In the prognosis layer 318, a prognostication is performed regarding the health of the system. The prognosis layer 318 receives the rate of degradation 316 regarding the system from the diagnosis layer 312. The prognosis layer 318 can apply any prognostication technique in predicting the future health of a component, assembly or system. In some implementations, the prognosis layer 318 applies one or more of the physics of failure, pattern recognition, numerical projection, trend analysis, extrapolation, interpolation, probability estimation, or uncertainty quantification in performing the prognostication. Based at least in part on the state determined by the diagnosis layer 312, the prognosis layer 318 prognosticates a future SOH 320 and a RUL 322 for the component, assembly or system. Here, the SOH 320 and the RUL 322 relate to the lubrication system. For example, the SOH 320 quantifies the health of the lubrication system using one or more numerical variables. As another example, the RUL 322 quantifies the currently expected lifetime of the lubrication system by a measure of time. Following the prognostication, one or more actions can be performed based at least in part on the SOH 320 and the RUL 322. Such action can include, but is not limited to, presenting information, performing a notification, or updating a schedule.

The above examples illustrate that a method can include: receiving, by at least one processor (e.g., of the detection layer 302) that performs operations by executing instructions, data (e.g., the signal(s) 306) generated by at least one sensor (e.g., the sensor(s) 304) of a vehicle, the sensor arranged to generate the data regarding at least one first component (e.g., the EOP) of the vehicle; providing, by the at least one processor, the data to at least one failure mode component (e.g., the failure mode component(s) 308) associated with the at least one first component, the at least one failure mode component configured to determine a likelihood (e.g., A, B or C) that a condition (e.g., low oil, starvation, or path plugged) exists with regard to the at least one first component; quantifying, by the at least one processor (e.g., of the diagnosis layer 312) and based at least in part on the likelihood, a first state (e.g., the state 314) of at least one first system (e.g., the lubrication system) of the vehicle, the at least one first system including the at least one first component; performing, by the at least one processor and based at least in part on the first state, a prognostication (e.g., in the prognosis layer 318) that indicates i) a SOH (e.g., the SOH 320) for the at least one first system, and ii) a RUL (e.g., the RUL 322) for the at least one first system; and performing, by the at least one processor and based at least in part on the SOH and the RUL, at least one action with regard to the vehicle.

Figure 4:
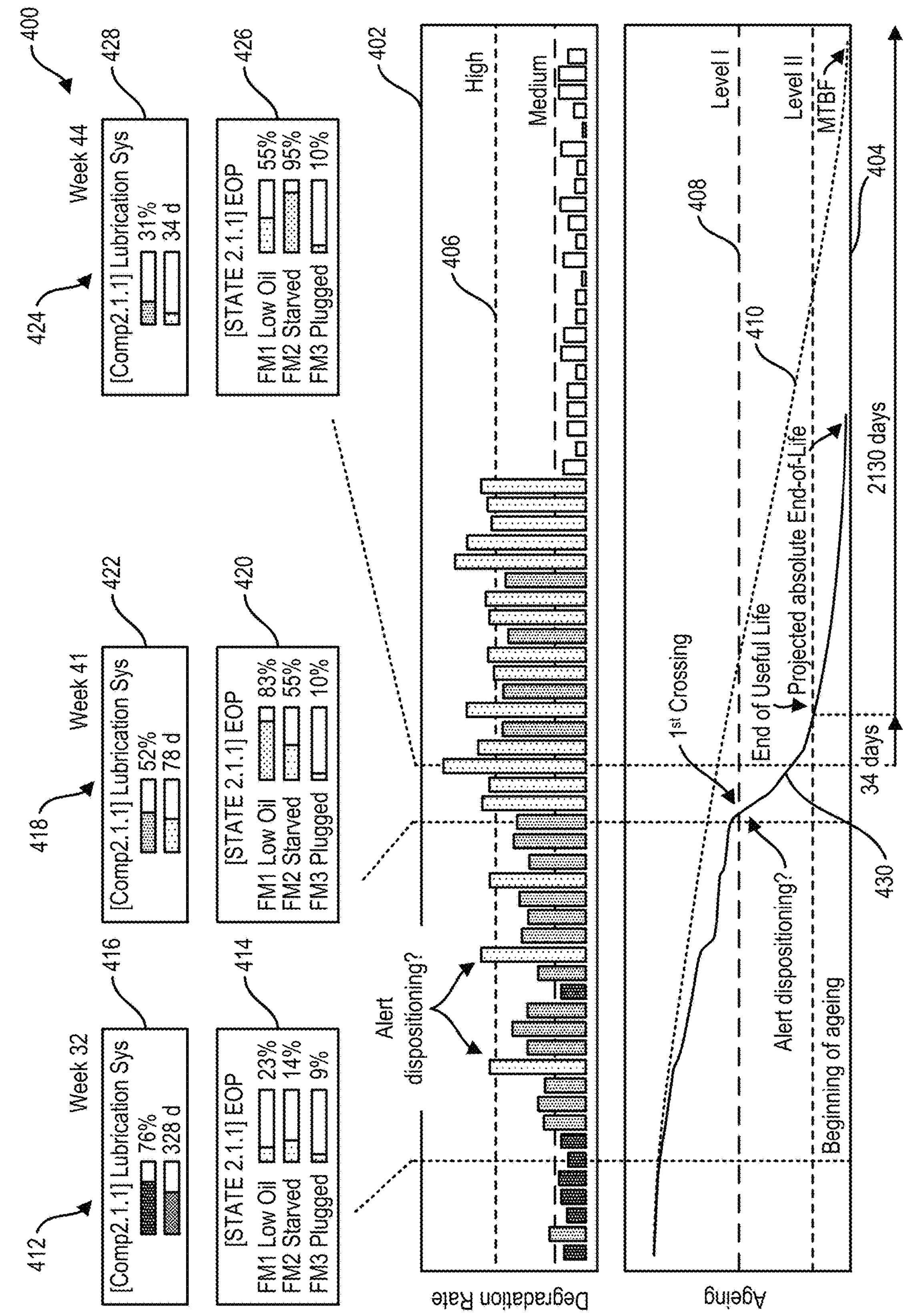
FIG. 4 shows an example of estimating a state of health (SOH) and a remaining useful life (RUL) for a vehicle.

FIG. 4 shows an example of estimating a SOH and a RUL for a vehicle. These examples can be used with one or more other examples described elsewhere herein. Here, information 400 that is presented regarding an estimation of SOH and RUL is specific to an individual vehicle over a period of time. The information 400 includes a chart 402 of degradation rate and a chart 404 of RUL. The chart 402 can indicate one or more thresholds 406 regarding the degradation rate indicated as horizontal dashed lines. For example, the thresholds 406 are here labeled "high" and "medium," respectively. The chart 402 includes values of the degradation rate determined at various points in time.

The chart 404 can indicate one or more thresholds 408 regarding the RUL indicated as horizontal dashed lines. For example, the thresholds 408 are here labeled "level I" and "level II," respectively. The difference between a "time of assessment" and the "End of Useful Life" is the RUL. The chart 404 includes values of the RUL determined at various points in time. The chart 404 can include a projection 410 of life under normal ageing regime. That is, the projection 410 can correspond to an initial expectation, before the component/assembly/system is used, of the expected lifetime. In this example, the projection 410 is strictly decreasing over time.

Information 412 relates to a time (here referred to as week 32) during the life of the vehicle. At week 32, a state 414 has been determined for the component (here the EOP). Based on the state 414, a prognostication 416 can be performed for the system (here the lubrication system) relating to week 32. For example, the prognostication 416 indicates the current SOH and RUL for the system at week 32.

Similarly, information 418 relates to another time (here referred to as week 41). At week 41, a state 420 has been determined for the component (here the EOP). Based on the state 420, a prognostication 422 can be performed for the system (here the lubrication system) relating to week 41. For example, the prognostication 422 indicates the current SOH and RUL for the system at week 41. The SOH and the RUL have both decreased compared to the prognostication 416.

Similarly, information 424 relates to another time (here referred to as week 44). At week 44, a state 426 has been determined for the component (here the EOP). Based on the state 426, a prognostication 428 can be performed for the system (here the lubrication system) relating to week 44. For example, the prognostication 428 indicates the current SOH and RUL for the system at week 44. The SOH and the RUL have both decreased compared to the prognostication 422. That is, a graph 430 in the chart 404 can indicate that the system can cross the threshold(s) 408 earlier than predicted by the projection 410. As such, one or more actions can be taken in response to detecting this development.

Figure 5:
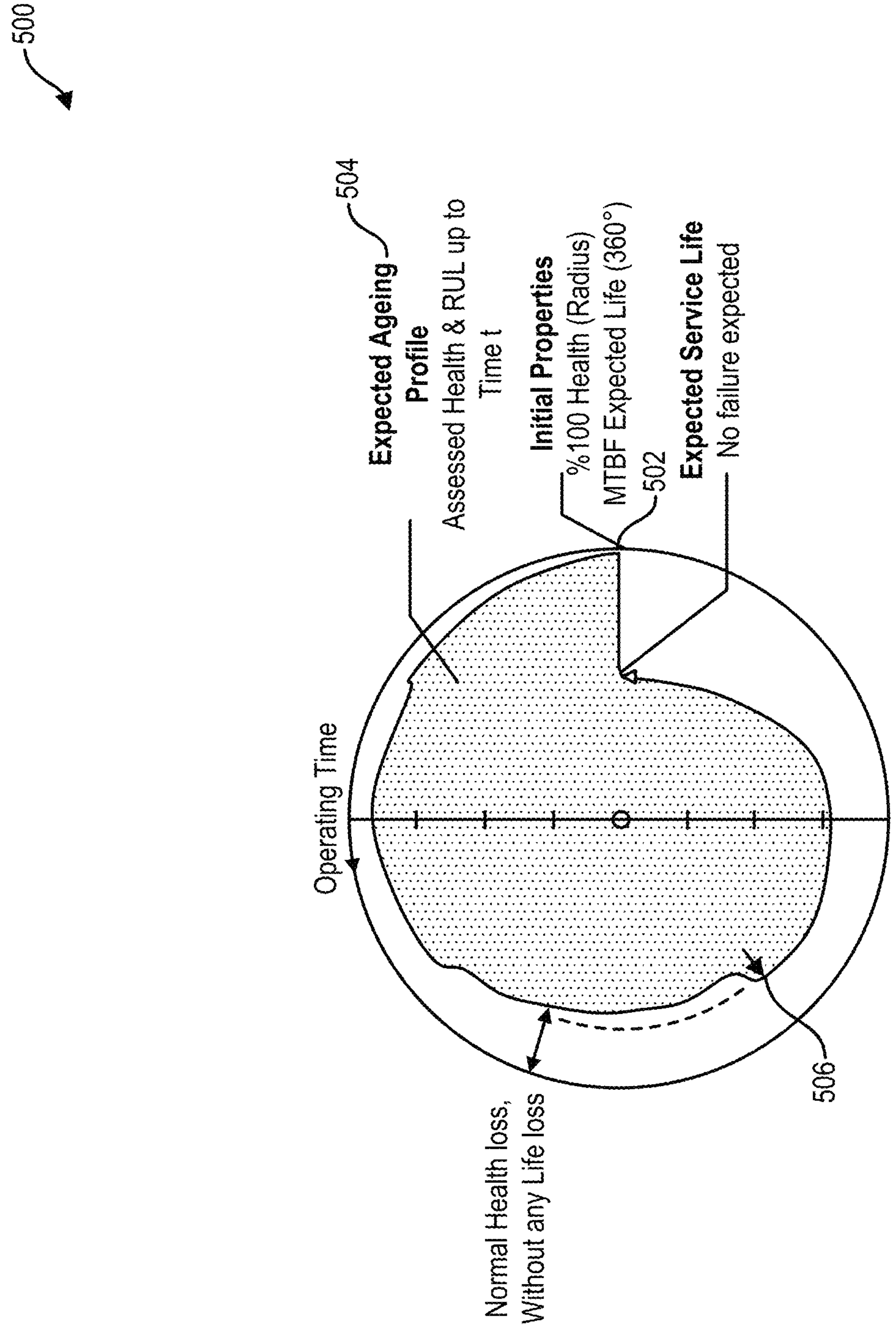
FIG. 5 shows an example of an ageing profile for a vehicle under normal ageing.

FIG. 5 shows an example of an ageing profile 500 for a vehicle under normal ageing. The ageing profile 500 can be used with one or more other examples described elsewhere herein. The ageing profile 500 illustrates a development that begins at a point 502 and proceeds in a counterclockwise direction. At the point 502, initial properties of the system can be specified. The health of the system (which can initially be defined as 100%) can be indicated against the radius of the ageing profile 500. The ageing profile 500 can be designed so that an expected life of the system (sometimes referred to as a mean time between failures, or MTBF) corresponds to a 360° counterclockwise turn around the ageing profile 500 starting at the point 502. An expected ageing profile 504 is shown. The expected ageing profile 504 indicates how the health is expected to vary over the lifetime of the system, the health indicated against the radius of the ageing profile 500. At any point along the edge of the expected ageing profile 504, the SOH corresponds to the distance between the edge and the original radius, whereas the RUL corresponds to the amount of time until the end of the expected service life (at full circle). A development 506 where the health improves to a higher level compared to an earlier time, can correspond to a change of circumstances, including, but not limited to, a change in driving style (e.g., from more aggressive to less aggressive) or a change in ambient conditions (e.g., the vehicle is subjected to a less harsh climate than previously).

Figure 6:
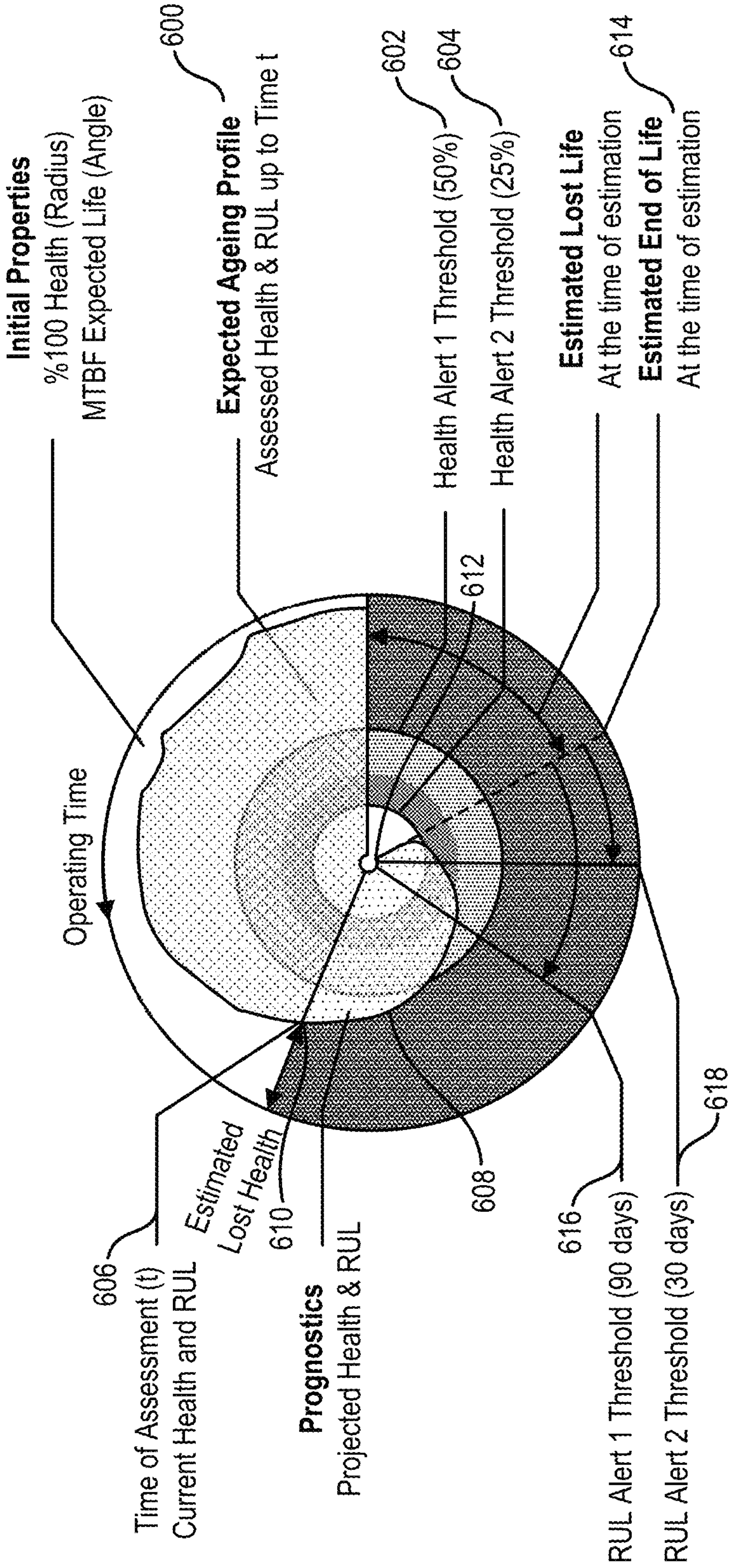
FIG. 6 shows an example of health estimation and prognostics for a vehicle.

FIG. 6 shows an example of health estimation and prognostics for a vehicle. This example can be used with one or more other examples described elsewhere herein. An expected ageing profile 600 similar to that described above can be defined. Thresholds can be defined as concentric circles. Here, a threshold 602 corresponds to 50% remaining health, and a threshold 604 to 25% remaining health, to name just two examples. A point 606 represents a time of assessment. That is, the component or assembly or system may be continuously monitored based on one or more sensor outputs, and the point 606 indicates when the assessment discussed in this example is made.

Based on each assessment, a prognosis can be made. Here a prognosis 608 made based on the assessment at the point 606 begins at an instance 610 (i.e., the health at the point 606) and extends until a point 612 that represents the currently expected end of life. Based on the prognosis 608, a point 614 represents the estimated end of life, which is sooner than initially estimated in the expected ageing profile. That is, the RUL has changed based on the difference in SOH. Accordingly, one or more alerts can be defined based on the prognosis 608. Here, a threshold 616 is defined to be 90 days before the point 614, and a threshold 618 is defined to be 30 days before the point 614.

Figure 7:
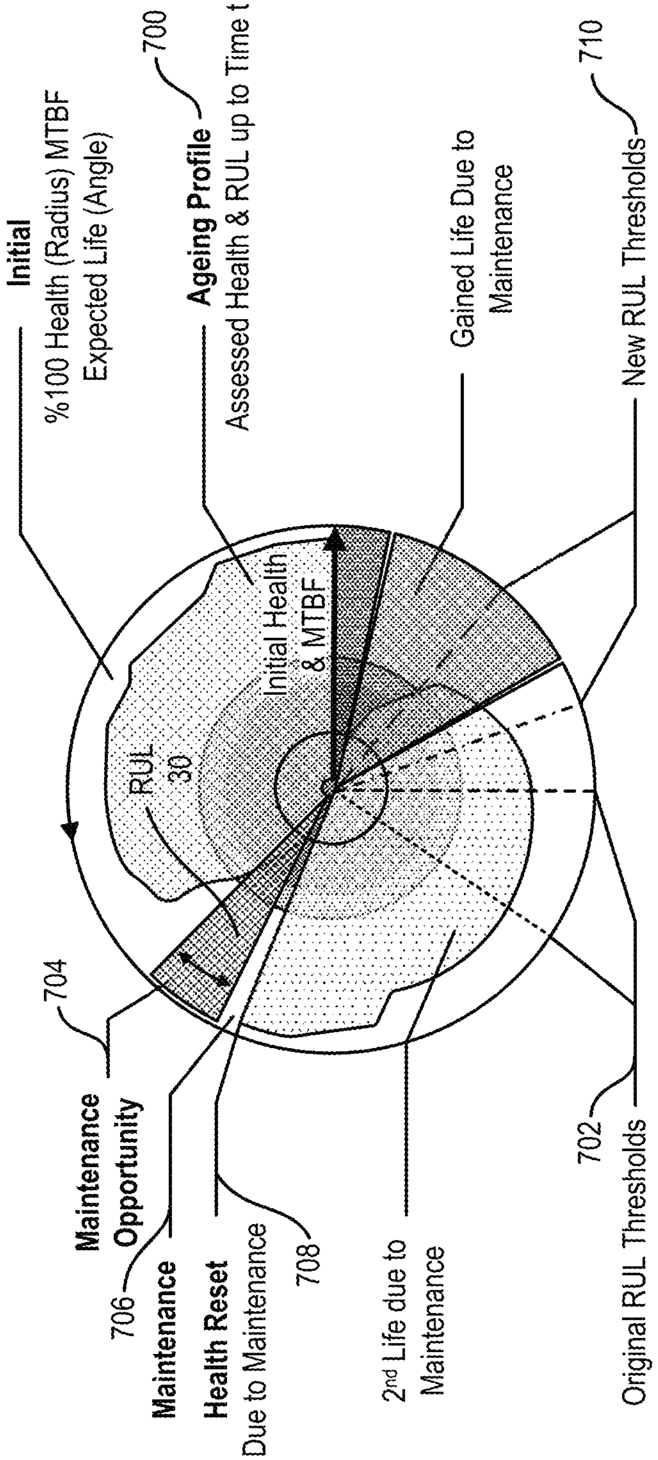
FIG. 7 shows an example of a maintenance opportunity for repair or replacement for a vehicle.

FIG. 7 shows an example of a maintenance opportunity for repair or replacement for a vehicle. This example can be used with one or more other examples described elsewhere herein. An ageing profile 700 for the vehicle is shown. Based on an ageing profile that was defined before the component/assembly/system was used, original RUL thresholds 702 may have been defined. However, based on the ageing profile 700, a shorter life span can be prognosticated. This can trigger the system to perform one or more actions to specify a maintenance opportunity 704. The maintenance opportunity 704 can be a window of time within which it is recommended that particular maintenance (e.g., replacement and/or repair) be performed. The length and placement in time of the maintenance opportunity 704 can be selected based on the circumstances. The maintenance opportunity 704 can be communicated to a customer (e.g., the owner or driver of the vehicle) and/or to a vehicle service organization (e.g., to ensure that a time slot/personnel and/or components are available). Maintenance 706 is here performed on the vehicle. Based on the maintenance 706, a health reset 708 can be indicated in the ageing profile 700. Based on the health reset 708, new RUL thresholds 710 can be prognosed.

Figure 8:
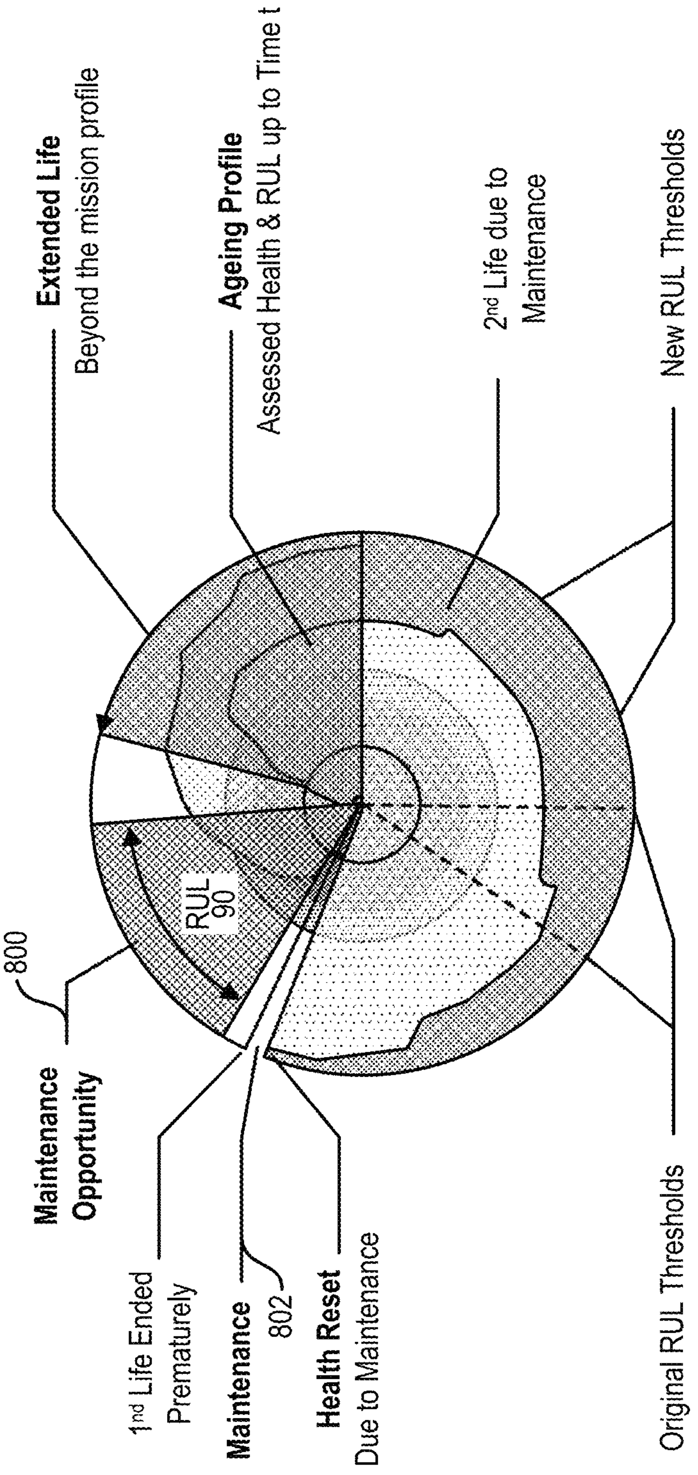
FIG. 8 shows an example of a maintenance opportunity for a vehicle having a wider time window than the maintenance opportunity in FIG. 7.

FIG. 8 shows an example of a maintenance opportunity 800 for a vehicle having a wider time window than the maintenance opportunity 704 in FIG. 7. The length and placement in time of the maintenance opportunity 800 can be estimated or prognosed based on the circumstances. Here, the maintenance opportunity 800 includes a longer time range than the maintenance opportunity 704 in FIG. 7. For example, the maintenance opportunity 800 can relate to a component or assembly or system of the vehicle that is deemed less critical than that of the maintenance opportunity 704. For example, under both scenarios (FIGS. 7 and 8) systems are failing at almost the identical end of life (at approximately a 10 o'clock position on the ageing profile), under this particular depiction of the maintenance opportunity 800, the pattern of the degradation allows to have a "90 day" time to service prognosed, whereas with the maintenance opportunity 704, the component failed so suddenly that it only allows to estimate the end of life with a 30-day lead time, giving a narrower maintenance opportunity. If maintenance 802 corresponding to the maintenance opportunity 800 is performed, a health reset can be defined similar to the example above.

Figure 9:
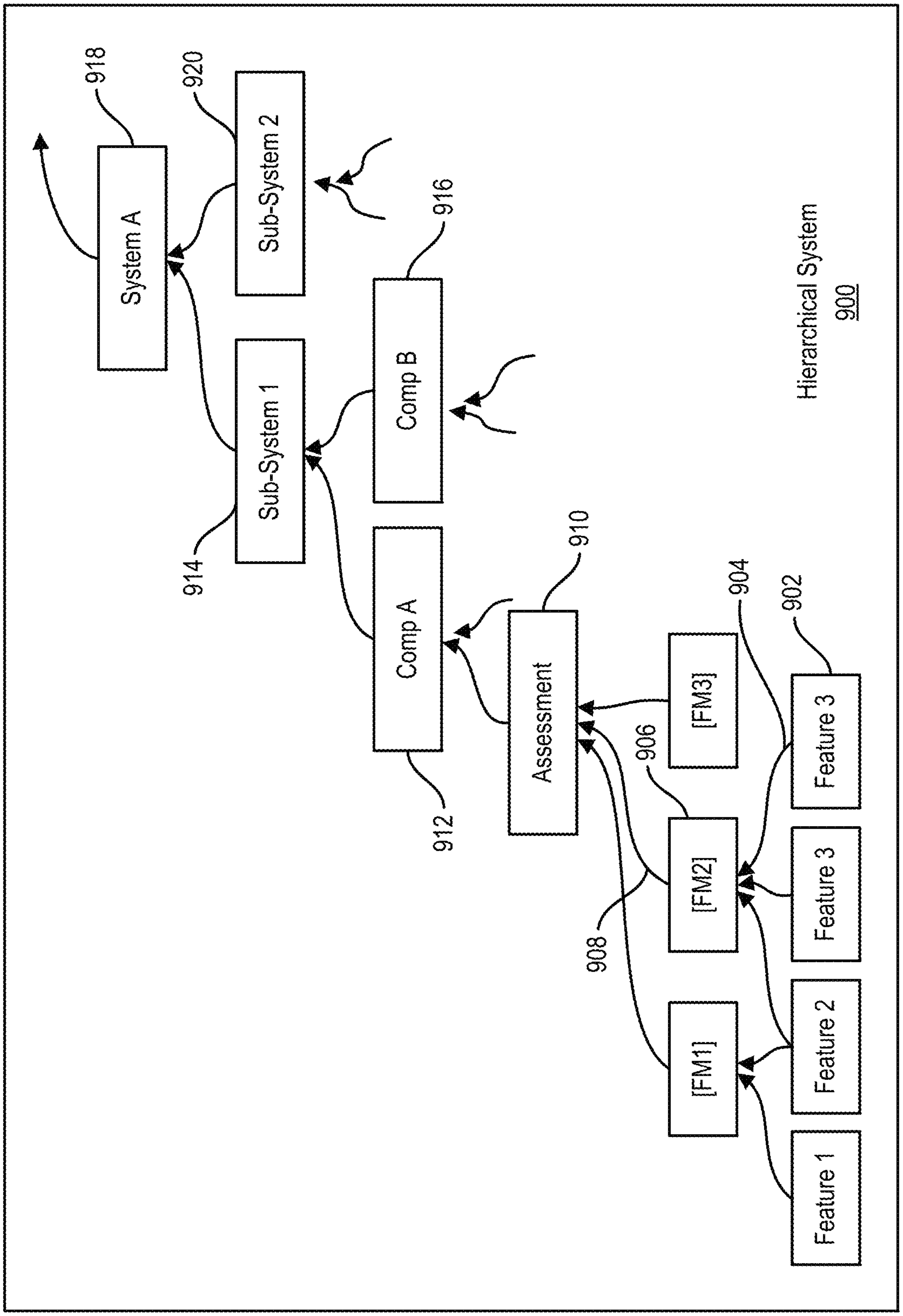
FIG. 9 shows an example of a hierarchical system that can be used in estimating SOH and RUL for a vehicle.

FIG. 9 shows an example of a hierarchical system 900 that can be used in estimating SOH and RUL for a vehicle. The hierarchical system 900 can be used with one or more other examples described elsewhere herein. The hierarchical system 900 illustrates that an aggregation framework can be provided to establish relationships between failure likelihoods of children and parents among the components, assemblies or systems of a vehicle. For example, a failure mode can extend or be propagated from a component to a system to the vehicle itself.

Similar to examples described earlier herein, the hierarchical system 900 can include sensors 902 that generate signals 904 about one or more components or assemblies or systems of a vehicle. In operation, the hierarchical system 900 can make use of features which are individual measurable properties within a recorded dataset, sometimes referred to as variables or attributes. Features are extracted from the signals 904; for illustrative purposes, each of the sensors 902 is labeled as relating to one of the features. The signals 904 can be used by one or more failure mode components 906 each of which implements a respective failure mode model. The failure mode components 906 generate likelihoods 908 that one or more conditions is currently present in the vehicle. The likelihoods 908 can be used in an assessment 910 regarding health. Here, the assessment 910 indicates the health (e.g., the SOH and/or the RUL) of a component 912. The component 912 is part of a sub-system 914 in the vehicle. That is, the health of the component 912 affects the health of the sub-system 914. However, while the health of the sub-system 914 also depends on the health of another component 916, the health of the component 912 in this example does not affect the health of the component 916.

The sub-system 914 is part of a system 918 in the vehicle. That is, the health of the sub-system 914 affects the health of the system 918. However, while the health of the system 918 also depends on the health of another sub-system 920, the health of the sub-system 914 in this example does not affect the health of the sub-system 920. That is, the hierarchical system 900 can include at least the sub-system 914 and the system 918, and their respective states can be quantified as part of managing health regarding the vehicle. For example, the prognostication of SOH and/or RUL for the system 918 can then at least in part be based on a prognostication of SOH and/or RUL for the sub-system 914. For example, a determination to perform an action can be based at least in part on the states of the sub-system 914 and the system 918. The sub-system 914 and the system 918 can be any of various systems that are part of the vehicle. In some implementations, the system 918 corresponds to the vehicle itself.

Figure 10:
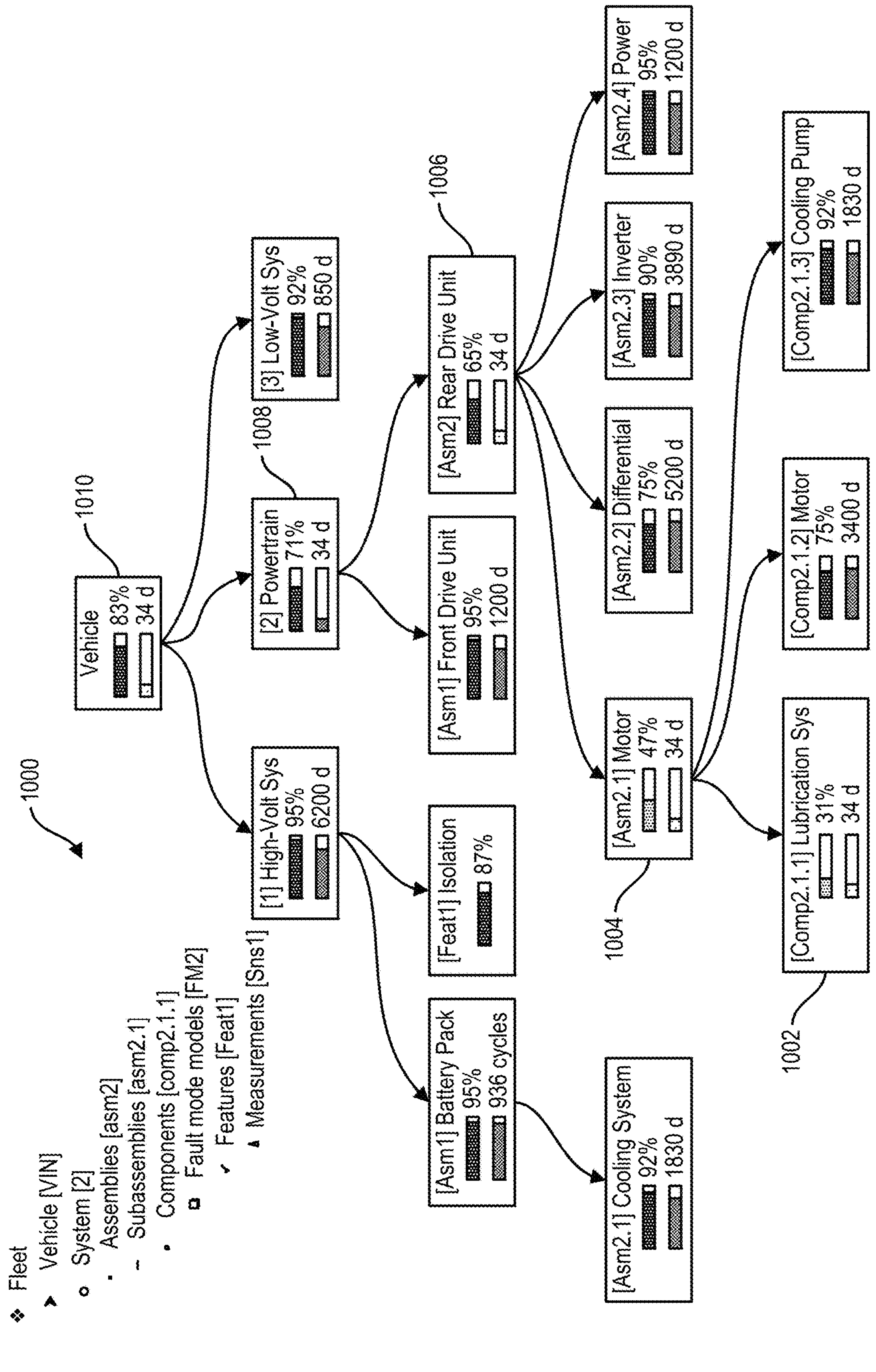
FIG. 10 shows an example of aggregating SOH and RUL from children to parents for a vehicle.

FIG. 10 shows an example of aggregating SOH and RUL from children to parents for a vehicle. This example can be used with one or more other examples described elsewhere herein. A hierarchy 1000 illustrates that health metrics can be managed and addressed at any of various levels of granularity. Here, for example, the hierarchy ends at the top with a level of a fleet of vehicles (e.g., managed by the maintenance organization and operated across different location), preceded by a level of an individual vehicle (e.g., associated with a unique vehicle identification number (VIN)), preceded by a level of a system within that vehicle, preceded by a level of an assembly that is part of such a system, preceded by a level of a subassembly that is part of such an assembly, preceded by a level of a component that is part of such a subassembly, preceded by a level of a fault mode model for such a component, preceded by a level of a feature that goes into such a fault mode model, which is preceded by a level of a measurement that goes into such a feature.

Only some of the possible hierarchy entities are shown and/or mentioned here for simplicity. The hierarchy 1000 can include one or more components 1002. Here, three instances of the component 1002 are labeled lubrication system, motor and cooling pump, respectively. The hierarchy 1000 can include one or more assemblies 1004. Here, the assembly 1004 is labeled motor. The assembly 1004 is part of another assembly 1006 that is labeled rear drive unit. The rear drive unit is also the parent of three other assemblies that are labeled differential, inverter and power component, respectively. The assembly 1006 is part of a system 1008 that is labeled powertrain. The powertrain is also the parent of another assembly that is labeled front drive unit. That is, the vehicle may have separate drive units in the front and rear, respectively. The system 1008 is part of a vehicle 1010. The vehicle 1010 is also the parent of all other systems in the same vehicle, of which a high-voltage system and a low-voltage system are here shown as examples. Each of the components 1002, assemblies 1004, assembly 1006, system 1008, and vehicle 1010 can have a respective SOH and RUL based on prognostication. That is, the hierarchy 1000 illustrates how the SOH and/or the RUL of lower constituents can affect (or not affect) the SOH and/or RUL of a higher constituent.

Figure 11:
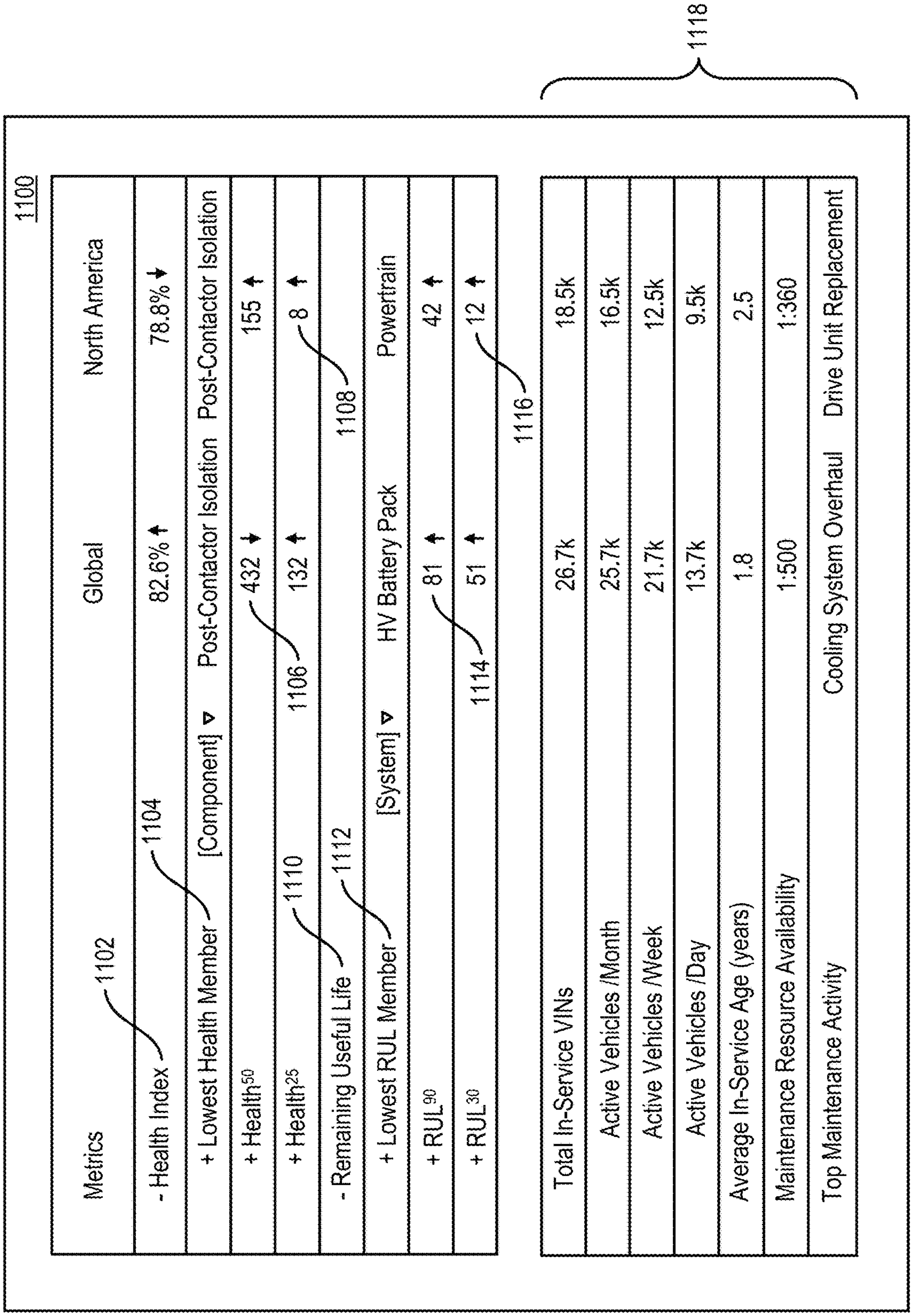
FIG. 11 shows an example of a presentation layer that includes information based on SOH and RUL for multiple vehicles.

FIG. 11 shows an example of a presentation layer 1100 that includes information based on SOH and RUL for multiple vehicles. The presentation layer 1100 can be used with one or more other examples described elsewhere herein. The presentation layer 1100 can be generated using the presentation layer 110 in FIG. 1, to name just one example. In this example, the presentation layer 1100 includes information relating to a fleet of vehicles. In some implementations, this can allow a service or maintenance organization for the vehicles to get a useful overview of the health of the fleet of vehicles and take action, preventive or corrective, as necessary. For example, the service/maintenance organization can use the presentation layer 1100 to perform a drilldown to seek a root cause relating to vehicle health in the fleet.

The presentation layer 1100 can include health index information 1102 corresponding to a SOH for the fleet. Here, the health index information 1102 indicates that the global fleet has a health index of 82.6%, whereas the North America portion of the global fleet has a health index of 78.8%. A control 1104 can allow a user of the presentation layer 1100 to identify, among the data underlying the presentation layer 1100, the statistics relating to the aspects of the fleet vehicles having the lowest health levels. Here, the control 1104 has been used to identify, among various components, the member with the lowest health index as being the failure mode of post-contactor isolation (wherein the amount of isolation after the contactor is a characteristic of the high-voltage system of an electric vehicle).

The information that is obtained using the control 1104 can be filtered or otherwise arranged in any of multiple ways. Here, data 1106 indicates that 432 vehicles of the global fleet are below a 50% health threshold with regard to post-contactor isolation, and this number is currently decreasing (as indicated by a down arrow). Similarly, data 1108 indicates that 8 vehicles of the North American fleet are below a 25% health threshold, and this number is currently increasing (as indicated by an up arrow). Other approaches can be used.

The presentation layer 1100 can include RUL information 1110 corresponding to a RUL for the fleet. A control 1112 can allow a user of the presentation layer 1100 to identify, among the data underlying the presentation layer 1100, the statistics relating to the aspects of the fleet vehicles having the lowest RULs. Here, the control 1112 has been used to identify, among systems, high-voltage (HV) battery pack as the most significant factor affecting RUL for the global fleet, whereas powertrain is the most significant factor affecting RUL for the North American fleet.

The information that is obtained using the control 1112 can be filtered or otherwise arranged in multiple ways. Here, data 1114 indicates that 81 vehicles of the global fleet are below a 90 day RUL threshold with regard to their HV battery packs, and this number is currently increasing. Similarly, data 1116 indicates that 12 vehicles of the North American fleet are below a 30 day RUL threshold with regard to their powertrains, and this number is currently increasing. Other approaches can be used.

The presentation layer 1100 can include an area 1118 with other information about the health of the fleet. The area 1118 can indicate information including, but not limited to the total number of vehicles (i.e., VINs) that are currently in service; how many of the in-service VINs have been active in the current month, week or day; the average age of the vehicles that are currently in service; a maintenance resource availability (e.g., the ratio of the number of available maintenance resources to the number of vehicles in the fleet); or a top maintenance activity for the fleet. Examples of maintenance resources include, but are not limited to, work stations, labor, parts, equipment, or tools required to conduct one or more maintenance activities at any of multiple service centers. The service centers can be operated by the vehicle manufacturer or by an organization that is separate from the vehicle manufacturer, to name just two examples. Other approaches can be used.

Figure 12:
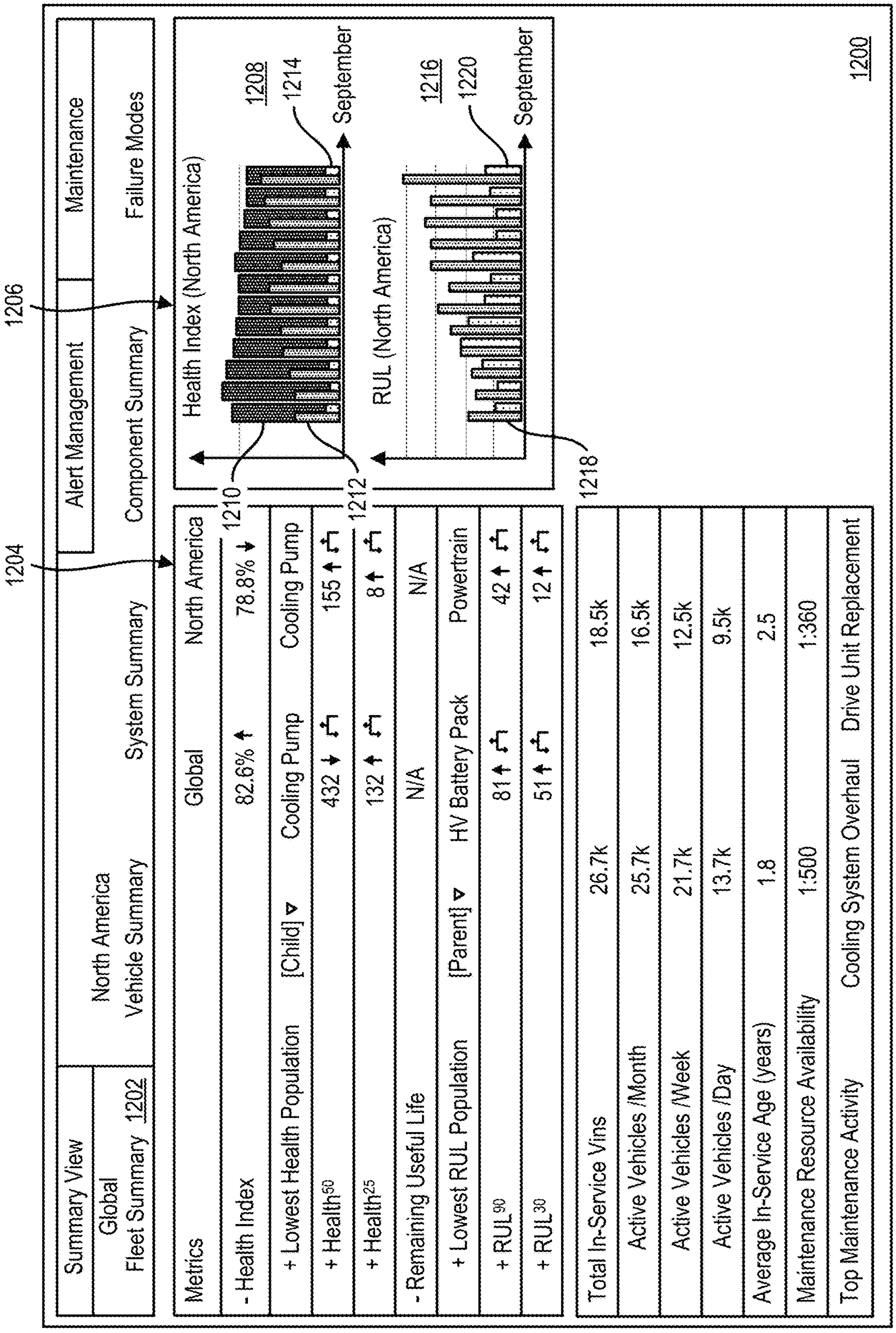
FIG. 12 shows another example of a presentation that includes information based on SOH and RUL for multiple vehicles, the information representing a fleet summary.

FIG. 12 shows another example of a presentation 1200 that includes information based on SOH and RUL for multiple vehicles, the information representing a fleet summary. The presentation 1200 can be used with one or more other examples described elsewhere herein. The presentation 1200 can be generated using the presentation layer 110 in FIG. 1, to name just one example.

The presentation 1200 can include a control 1202 that can be activated to provide a summary of health information regarding a fleet of vehicles. The presentation 1200 can include information 1204 that can represent some or all of the examples described regarding the presentation layer 1100 in FIG. 11.

The presentation 1200 can include information 1206 relating to development of fleet health over time. A chart 1208 here shows the days of one month (September) on the horizontal axis and both health index percent for the level of interest and number of vehicle identification numbers (VINs) on the vertical axis. The chart 1208 includes bars 1210 representing the health index of the North American fleet in percent per day over the month of September; bars 1212 representing the number of VINs that are below a 50% health index threshold; and bars 1214 representing the number of VINs that are below a 25% health index threshold. A chart 1216 here includes bars 1218 representing the number of VINs that are below a 90 day RUL threshold, and bars 1220 representing the number of vehicles of the North American fleet that are below 30 day RUL threshold.

Figure 13B:
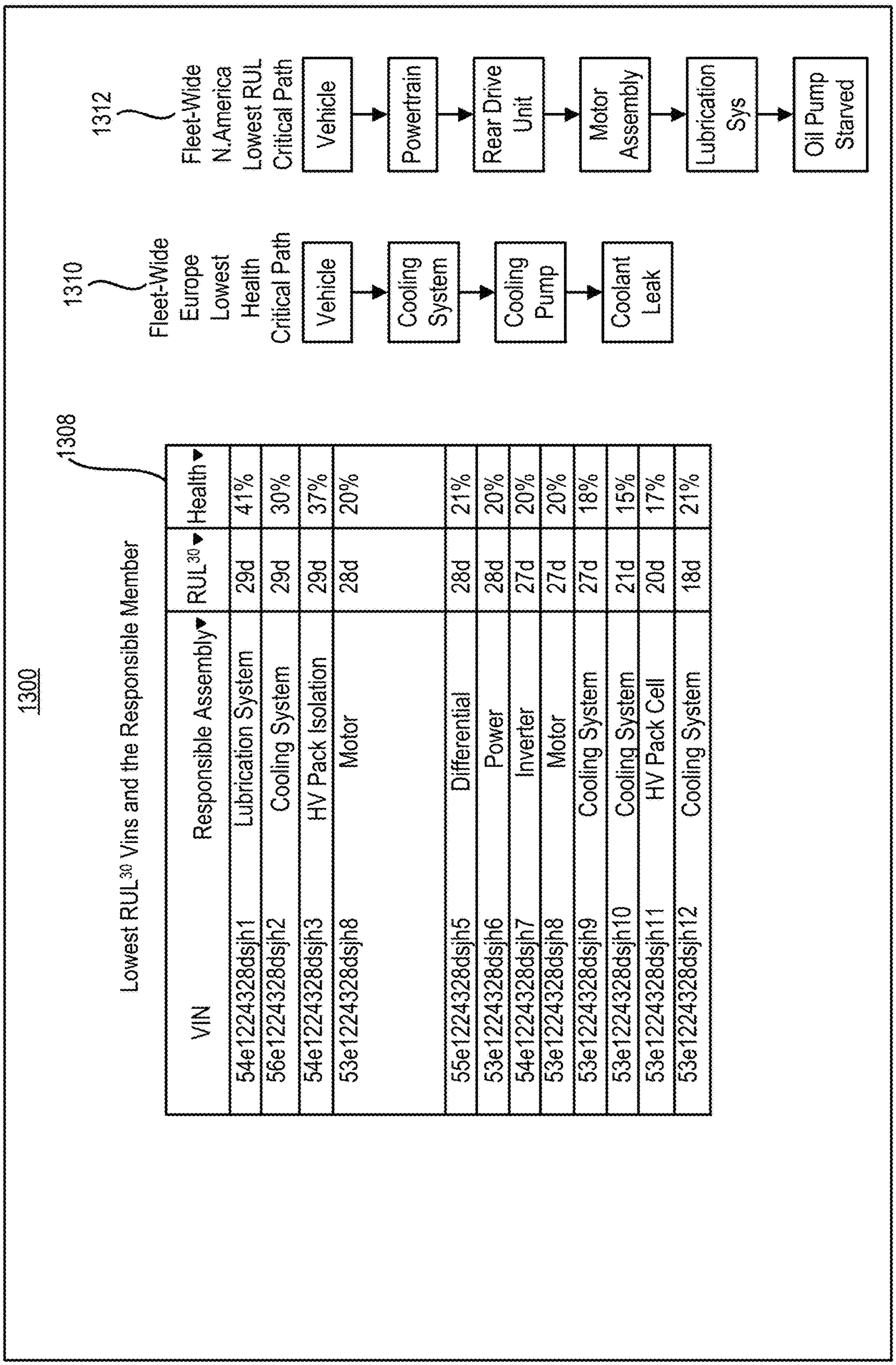

FIGS. 13A-13B show an example of information 1300 that can be included in the presentation 1200 of FIG. 12. The information 1300 can allow a user to perform a drilldown to identify a root cause of a health status. The information 1300 can include information 1302 regarding the fleet members with the lowest health by component. For example, the information 1302 indicates that rear drive differential is a significant factor driving the health of the North American fleet.

The information 1300 can include information 1304 regarding the fleet members with the lowest RUL by a system. For example, the information 1304 indicates that the rear drive unit is a significant factor driving the RUL of the North American fleet.

The information 1300 can include information 1306 regarding the VINs (i.e., individual vehicles) having the lowest SOH (below a SOH threshold) and the assembly that is chiefly responsible for their low SOH. For example, the information 1306 indicates that the motor is a significant factor for two of the vehicles.

The information 1300 can include information 1308 regarding the VINs having the lowest RUL (below a RUL threshold) and the assembly that is chiefly responsible for their low RUL. For example, the information 1306 indicates that the cooling system is a significant factor for four of the vehicles.

The information 1300 can include information 1310 that indicates the critical path for the fleet members that have the lowest SOH or RUL, respectively. For example, a critical path 1312 for the North American fleet indicates that in the vehicles with the lowest RUL the chief factor is that an oil pump is starved. That is, oil pump starvation affects the health of the lubrication system, which affects the health of the motor assembly, which affects the health of the rear drive unit, which affects the health of the powertrain, which affects the health of the whole vehicle.

Figure 14:
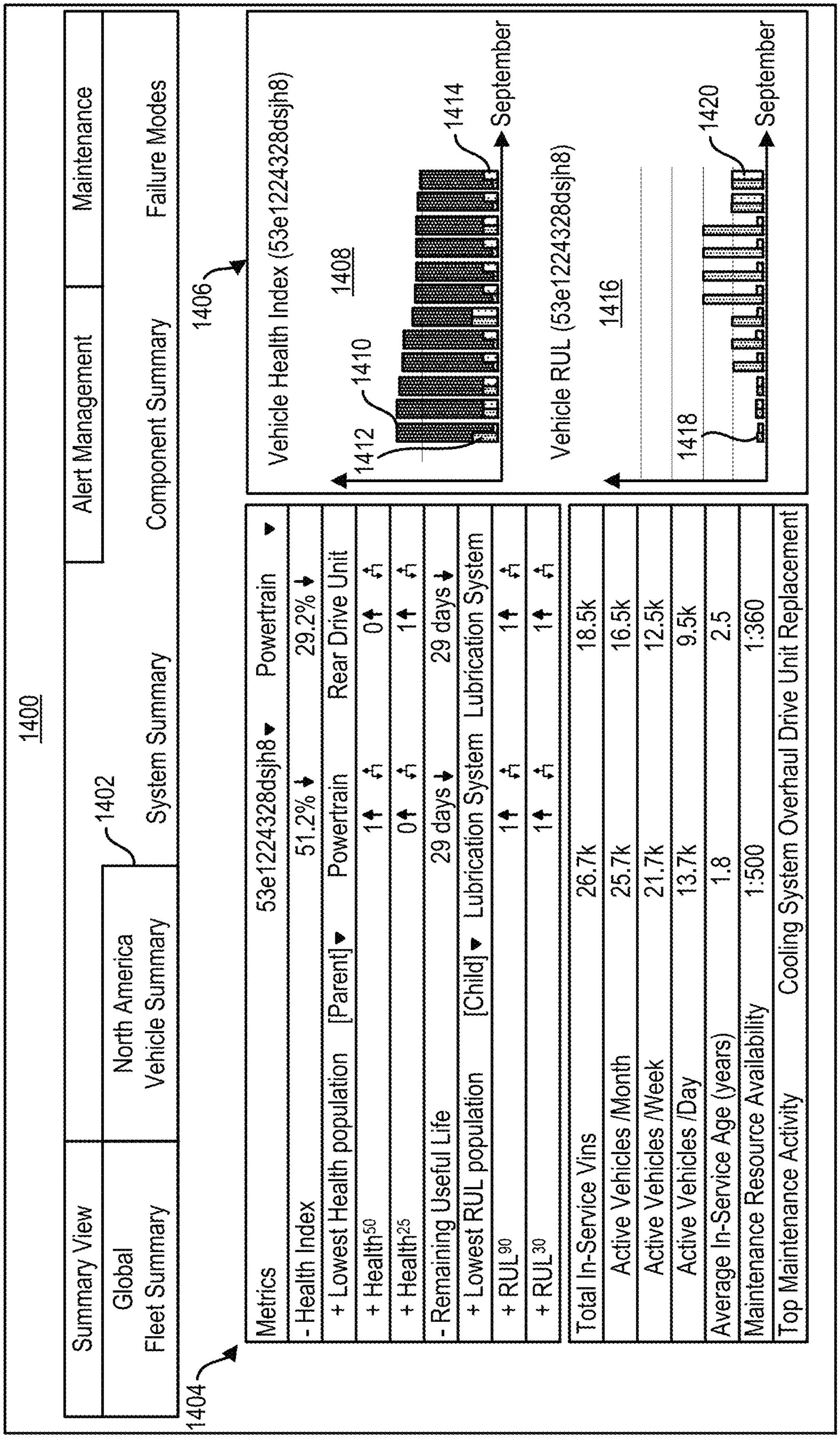
FIG. 14 shows another example of a presentation that includes information based on SOH and RUL for a single vehicle.

FIG. 14 shows another example of a presentation 1400 that includes information based on SOH and RUL for a single vehicle, the information representing a vehicle summary. The presentation 1400 can be used with one or more other examples described elsewhere herein. The presentation 1400 can be generated using the presentation layer 110 in FIG. 1, to name just one example.

The presentation 1400 can include a control 1402 that can be activated to provide a summary of health information regarding an individual vehicle. The presentation 1400 can include information 1404 that can represent some or all of the examples described regarding the presentation layer 1100 in FIG. 11.

The presentation 1400 can include information 1406 relating to development of individual vehicle health over time. A chart 1408 here includes bars 1410 representing the health index of the vehicle over the month of September; bars 1412 representing the number of systems of the vehicle that are below a 50% health threshold; and bars 1414 representing the number of systems of the vehicle that are below a 25% health threshold. A chart 1416 here includes bars 1418 representing the number of systems of the vehicle that are below a 90 day RUL threshold, and bars 1420 representing the number of systems of the vehicle that are below 30 day RUL threshold.

Figure 15:
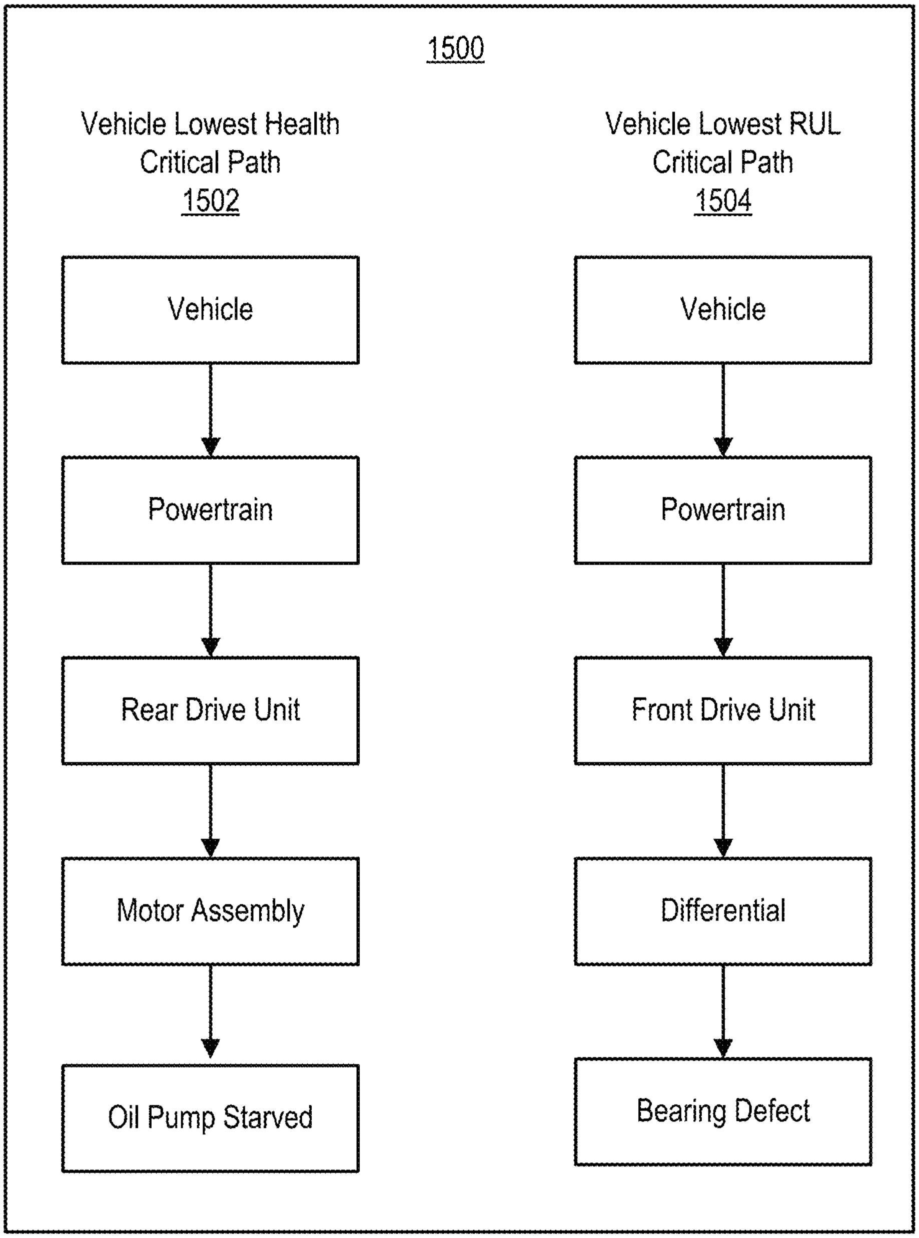
FIG. 15 shows an example of information that can be included in the presentation of FIG. 14, the information facilitating a drilldown regarding vehicle health.

FIG. 15 shows an example of information 1500 that can be included in the presentation of FIG. 14, the information facilitating a drilldown regarding vehicle-level health to identify a root cause of a health status. The information 1500 can include information 1502 that indicates the critical path for the components that have the lowest SOH. For example, the information 1502 indicates that the chief factor is an oil pump. That is, the health of the oil pump affects the health of the lubrication system, which affects the health of the motor assembly, which affects the health of the rear drive unit, which affects the health of the powertrain, which affects the health of the whole vehicle.

The information 1500 can include information 1504 that indicates the critical path for the components that have the lowest RUL. For example, the information 1504 indicates that the chief factor is oil pump starvation. That is, oil pump starvation affects the health of the lubrication system, which affects the health of the motor assembly, which affects the health of the rear drive unit, which affects the health of the powertrain, which affects the health of the whole vehicle.

Figure 16:
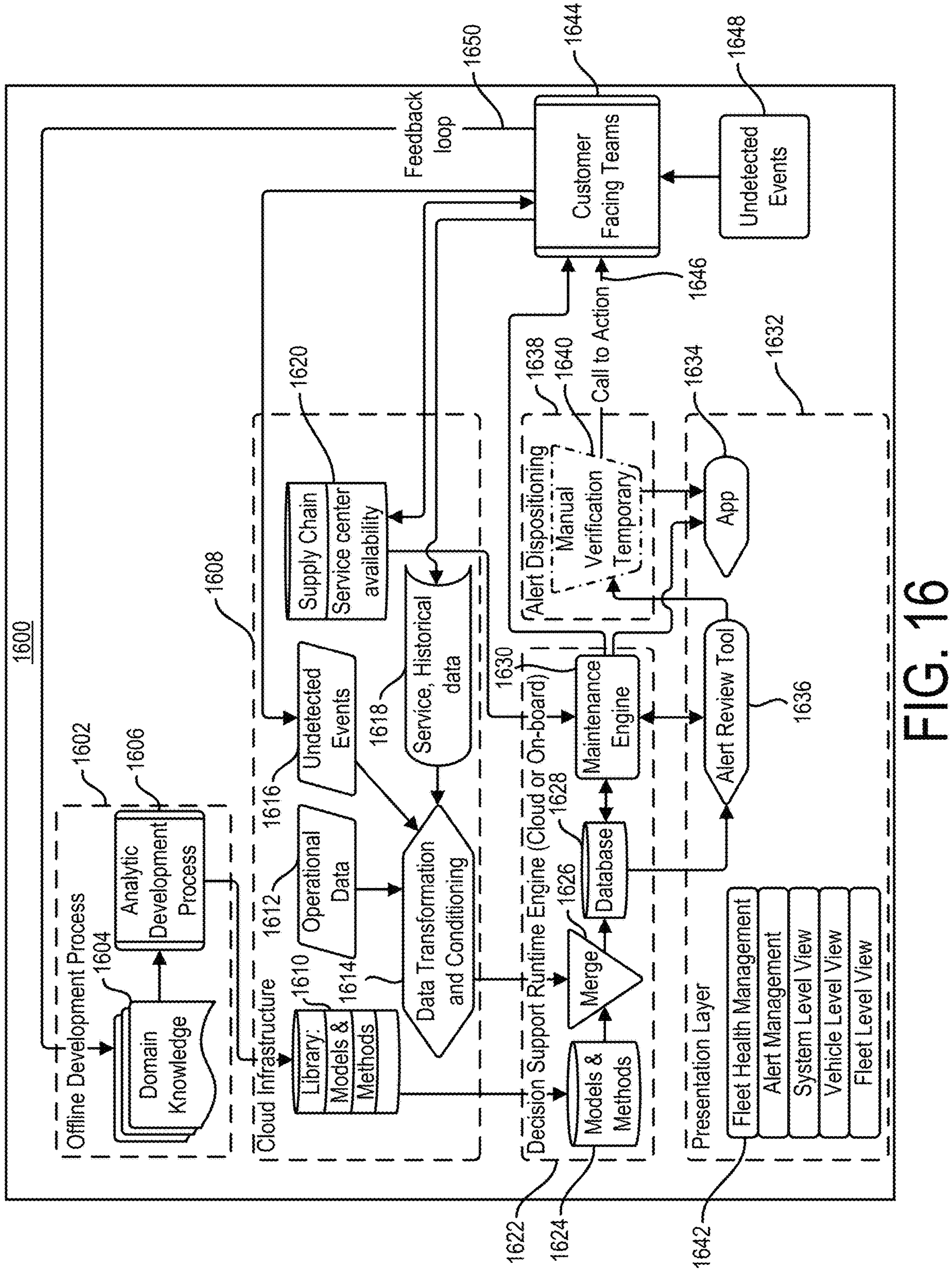
FIG. 16 shows an example of a health management system.

FIG. 16 shows an example of a health management system 1600. The health management system 1600 can be used with one or more other examples described elsewhere herein. The health management system 1600 can be implemented using some or all components described below with reference to FIG. 18.

The health management system 1600 can be implemented as a cloud solution, or to be executed locally on an individual vehicle, or by a combination of these approaches. When multiple processors are used for executing instructions to operate the components of the health management system 1600, at least one of the multiple processors can be located onboard the vehicle, and at least another one of the multiple processors can be located in a cloud that is separate from the vehicle. In some implementations, an entirety of the health management system 1600 can be implemented onboard the vehicle. In some implementations, a portion of the health management system 1600 is implemented onboard the vehicle, and a remaining portion of the health management system 1600 is implemented in a cloud separate from the vehicle. In some implementations, an entirety of the health management system 1600 is implemented in a cloud separate from the vehicle, and the health management system 1600 can receive data generated by one or more sensors by a wireless communication sent from the vehicle to the cloud. References to a cloud or on-board installation in this description or in the drawings are for illustrative purposes and do not indicate the only possible implementation.

The health management system 1600 includes an offline development process 1602 in which domain knowledge 1604 is used in an analytic development process 1606. For example, the domain knowledge 1604 represents all aspects of the components, assemblies and systems that make up a vehicle, and the analytic development process 1606 establishes how failures propagate among these entities. For example, the health management system 1600 can implement some or all aspects of the framework 100 of FIG. 1.

The health management system 1600 includes cloud infrastructure 1608 that contains a library 1610. In some implementations, the library 1610 can include one or more models and methods relating to health management for a vehicle. Models can represent baseline behavior, failure modes and behavior of faulty components, assemblies and systems. Models can describe the algorithms required to make health and/or remaining life estimations. For example, baseline behavior can be interpreted as standard performance versus failure modes. The methods can represent hyperparameters for aggregation and roll-ups, safety and maintenance requirements.

The health management system 1600 includes operational data 1612. In some implementations, the operational data 1612 can include telemetry data of the vehicle. For example, the operational data 1612 can be included in outputs generated by sensors of the vehicle. The operational data 1612 is provided to a component 1614 responsible for data transformation and conditioning. For example, depending on capability, the component 1614 can be a separate ECU dedicated for computing, or the ECU that generates the data itself. The component 1614 can also receive and take into account undetected events 1616 (e.g., occurred events that were not accounted for by the models) and data 1618 representing service data and historical data about the vehicle. The component 1614 can prepare the operational data 1612, the undetected events 1616 and the data 1618 into a form suitable for further processing in the health management system 1600. The cloud infrastructure 1608 can also include a database 1620 relating to supply chain information and service center availability, for example as will be discussed below.

The health management system 1600 includes a decision support runtime engine 1622 that can facilitate health management by supporting the making of decisions regarding the vehicle's health. The decision support runtime engine 1622 has access to models and methods 1624 from the library 1610. For example, the models and methods 1624 can be those relevant to a particular vehicle type and/or to a specific geographic region. The decision support runtime engine 1622 can perform a merge 1626 of at least output from the component 1614 and one or more of the models and methods 1624. The result of the merge 1626 can be entered in a database 1628 of the decision support runtime engine 1622.

The database 1628 can provide information that supports operation of one or more aspects of the health management system 1600. In some implementations, the database 1628 supports operation of a maintenance engine 1630 of the decision support runtime engine 1622. For example, the maintenance engine 1630 can have access to supply chain information (e.g., when a spare part will be available) and service center availability (e.g., when a vehicle can be serviced) from the database 1620. The maintenance engine 1630 can make one or more outputs to a presentation layer 1632. In some implementations, the output can inform a customer (e.g., an owner or operator of the vehicle) and/or a service provider and/or supply chain personnel about a maintenance window regarding the vehicle. For example, output to a customer can be communicated via an app 1634 (e.g., at a GUI of the vehicle or on a mobile device).

The database 1628 can provide output to an alert review tool 1636 of the presentation layer 1632. In some implementations, the alert review tool 1636 can provide some or all outputs to an alert dispositioning 1638 that can subject the alert to manual verification 1640. For example, this can avoid a situation where unnecessary alerts or other communications are provided to the customer. Also or instead, this can automatically pass through validated, high confidence alerts without human review.

The presentation layer 1632 can include multiple views 1642 for health information. For example, the multiple views 1642 can facilitate alert management, a system level view (e.g., an overview of the health management system 1600), a vehicle level view (e.g., as in FIG. 14), or a fleet level view (e.g., as in FIG. 12).

The maintenance engine 1630 can provide output to a customer facing teams 1644. For example, the output can indicate the need for maintenance regarding a component or assembly or system, whether for an individual vehicle (e.g., so the customer facing teams 1644 can schedule the appointment) or for multiple vehicles of a fleet (e.g., so the customer facing teams 1644 is alerted about a possible increased demand in the future. In some implementations, the alert dispositioning 1638 can generate a call to action 1646 to the customer facing teams 1644 when a particular health circumstance is detected in the output of the alert review tool 1636. Undetected events 1648 reported by customers or staff can be provided to the customer facing teams 1644 can form the basis for the undetected events 1616 of the cloud infrastructure 1608. The customer facing teams 1644 can provide a feedback loop 1650 to the domain knowledge 1604. For example, the feedback loop 1650 can seek to complement and/or correct the domain knowledge 1604 regarding health-related circumstances that have been observed by the customer facing teams 1644.

The above examples illustrate that a system (e.g., the health management system 1600) can include: a data interface (e.g., to receive the operational data 1612 from one or more of the sensors 304 in FIG. 3) to receive data generated by at least one sensor of a vehicle, the sensor arranged to generate the data regarding at least one first component of the vehicle; a decision support runtime engine (e.g., the decision support runtime engine 1622), implemented using at least one processor that performs operations by executing instructions, the decision support runtime engine to determine, with regard to the at least one vehicle and based at least in part on the data, i) a SOH for at least one first system of the vehicle that includes the at least one first component, and ii) a RUL for the at least one first system; and a component (e.g., the presentation layer 1632 or the app 1634 or the customer facing teams 1644) to perform, based at least in part on the SOH and the RUL, at least one action (e.g., notify that maintenance should be performed, and/or facilitate such maintenance) with regard to the vehicle.

Figure 17:
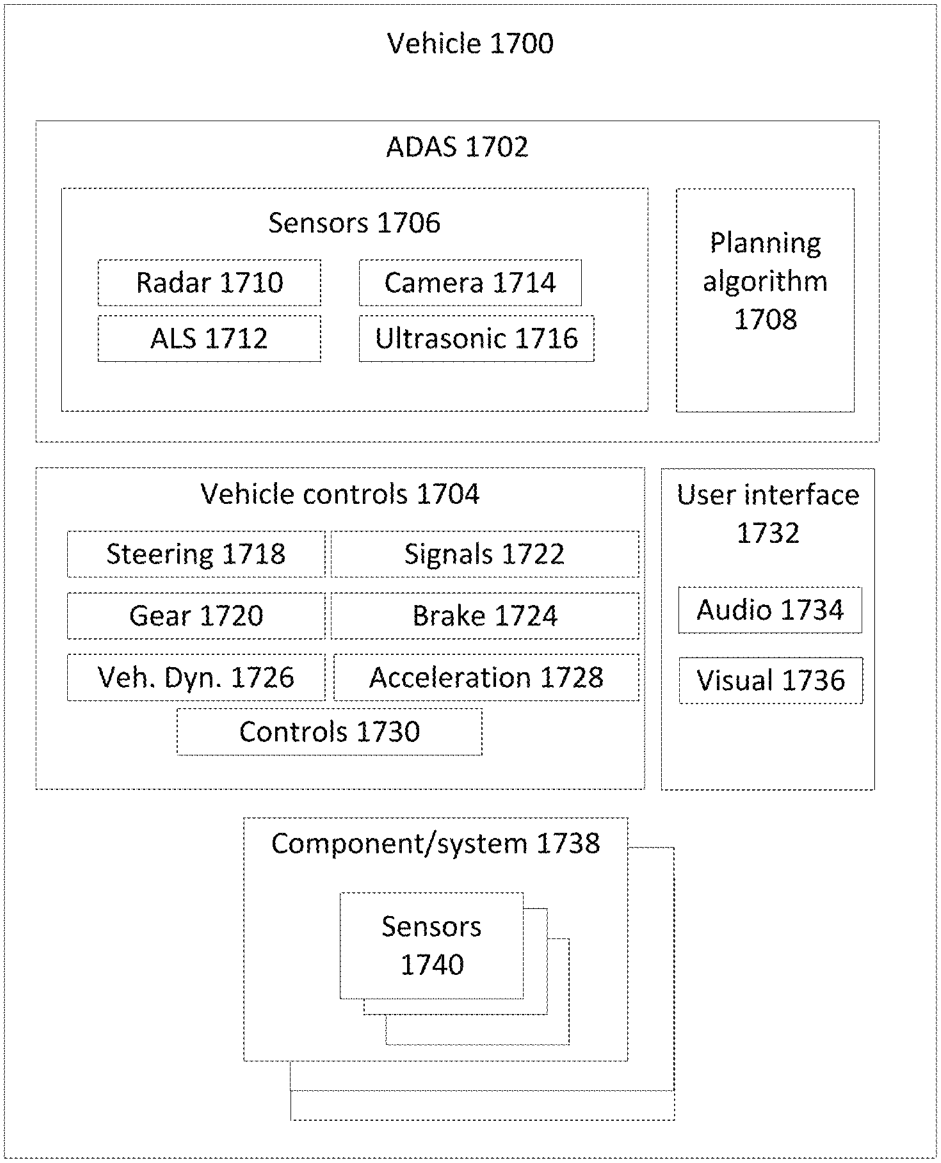
FIG. 17 shows an example of a vehicle.

FIG. 17 shows an example of a vehicle 1700. The vehicle 1700 can be used with one or more other examples described elsewhere herein. The vehicle 1700 includes an ADAS 1702 and vehicle controls 1704. The ADAS 1702 includes sensors 1706 and a planning algorithm 1708. Other aspects that the vehicle 1700 may include, including, but not limited to, other components of the vehicle 1700 where the ADAS 1702 may be implemented, are omitted here for simplicity.

The sensors 1706 are here described as also including appropriate circuitry and/or executable programming for processing sensor output and performing a detection based on the processing. The sensors 1706 can include a radar 1710. In some implementations, the radar 1710 can include any object detection system that is based at least in part on radio waves. For example, the radar 1710 can be oriented in a forward direction relative to the vehicle and can be used for detecting at least a distance to one or more other objects (e.g., another vehicle). The radar 1710 can detect the surroundings of the vehicle 1700 by sensing the presence of an object in relation to the vehicle 1700.

The sensors 1706 can include an active light sensor 1712. In some implementations, the active light sensor 1712 can include any object detection system that is based at least in part on laser light or LED light. For example, the active light sensor 1712 can include a LiDAR. The active light sensor 1712 can be oriented in any direction relative to the vehicle and can be used for detecting at least a distance to one or more other objects (e.g., another vehicle). The active light sensor 1712 can detect the surroundings of the vehicle 1700 by sensing the presence of an object in relation to the vehicle 1700.

The sensors 1706 can include one or more cameras 1714. In some implementations, the cameras 1714 can include any image sensor whose signal(s) the vehicle 1700 takes into account. For example, the cameras 1714 can be oriented in any of multiple directions relative to the vehicle and can be used for detecting vehicles or other objects, lanes, lane markings, curbs, and/or road signage.

The sensors 1706 can include an ultrasonic sensor 1716. The ultrasonic sensor 1716 can include any device that determines location based on generating and detecting sound waves.

Any of the sensors 1706 alone, or two or more of the sensors 1706 collectively, can detect, whether or not the ADAS 1702 is controlling motion of the vehicle 1700, the surroundings of the vehicle 1700. In some implementations, at least one of the sensors 1706 can generate an output that is taken into account in providing a prompt to a driver, and/or in controlling motion of the vehicle 1700. For example, the output of two or more sensors can be combined. In some implementations, one or more other types of sensors can additionally or instead be included in the sensors 1706. The ADAS 1702 can perform motion planning and/or plan a trajectory for the vehicle 1700 based on the output(s) of one or more of the sensors 1706.

The vehicle controls 1704 can include a steering control 1718. In some implementations, the ADAS 1702 and/or another driver of the vehicle 1700 controls the trajectory of the vehicle 1700 by adjusting a steering angle of at least one wheel by way of manipulating the steering control 1718. The steering control 1718 can be configured for controlling the steering angle though a mechanical connection between the steering control 1718 and the adjustable wheel, or can be part of a steer-by-wire system.

The vehicle controls 1704 can include a gear control 1720. In some implementations, the ADAS 1702 and/or another driver of the vehicle 1700 uses the gear control 1720 to choose from among multiple operating modes of a vehicle (e.g., a Drive mode, a Neutral mode, or a Park mode). For example, the gear control 1720 can be used to control an automatic transmission in the vehicle 1700.

The vehicle controls 1704 can include signal controls 1722. In some implementations, the signal controls 1722 can control one or more signals that the vehicle 1700 can generate. For example, the signal controls 1722 can control a turn signal and/or a horn of the vehicle 1700.

The vehicle controls 1704 can include brake controls 1724. In some implementations, the brake controls 1724 can control one or more types of braking systems designed to slow down the vehicle, stop the vehicle, and/or maintain the vehicle at a standstill when stopped. For example, the brake controls 1724 can be actuated by the ADAS 1702. As another example, the brake controls 1724 can be actuated by the driver using a brake pedal.

The vehicle controls 1704 can include a vehicle dynamic system 1726. In some implementations, the vehicle dynamic system 1726 can control one or more functions of the vehicle 1700 in addition to, or in the absence of, or in lieu of, the driver's control. For example, when the vehicle comes to a stop on a hill, the vehicle dynamic system 1726 can hold the vehicle at standstill if the driver does not activate the brake control 1724 (e.g., step on the brake pedal).

The vehicle controls 1704 can include an acceleration control 1728. In some implementations, the acceleration control 1728 can control one or more types of propulsion motor of the vehicle. For example, the acceleration control 1728 can control the electric motor(s) and/or the internal-combustion motor(s) of the vehicle 1700.

The vehicle controls 1704 can include one or more other controls 1730 in addition to those exemplified above.

The vehicle 1700 can include a user interface 1732. The user interface 1732 can include an audio interface 1734. In some implementations, the audio interface 1734 can include one or more speakers positioned in the passenger compartment. For example, the audio interface 1734 can at least in part operate together with an infotainment system in the vehicle.

The user interface 1732 can include a visual interface 1736. In some implementations, the visual interface 1736 can include at least one display device in the passenger compartment of the vehicle 1700. For example, the visual interface 1736 can include a touchscreen device and/or an instrument cluster display.

The vehicle 1700 can include one or more components/systems 1738 involved in the vehicle's operation. Each of the components/systems 1738 can relate to, without limitation, one or more of vehicle propulsion, motor control, power management, battery control, safety, thermal control, or stability. For example, any of the components/systems 1738 can be, or be included in any of a high-voltage system, a powertrain, a low-voltage system of the vehicle 1700, a battery pack, a drive unit, a cooling system, a motor, a differential, an inverter, a power board, a lubrication system, or a cooling pump.

Each of the components/systems 1738 can include one or more sensors 1740. Each of the sensors 1740 can be arranged and configured for detecting whether the components/systems 1738 are operating normally or nominally, or whether any deviation from normal or nominal behavior is occurring. Any of the sensors 1740 can output a signal corresponding to a voltage of an EOP, a current of the EOP, a speed of the EOP, or a oil temperature of the EOP, respectively, to name just a few examples. The output(s) of the sensor(s) 1740 can be taken into account in managing the health of the vehicle 1700, for example as described elsewhere herein.

Computer-based techniques, processes, components, or systems described herein can be implemented by way of one or more processors executing instructions stored in a non-transitory computer-readable medium.

Figure 18:
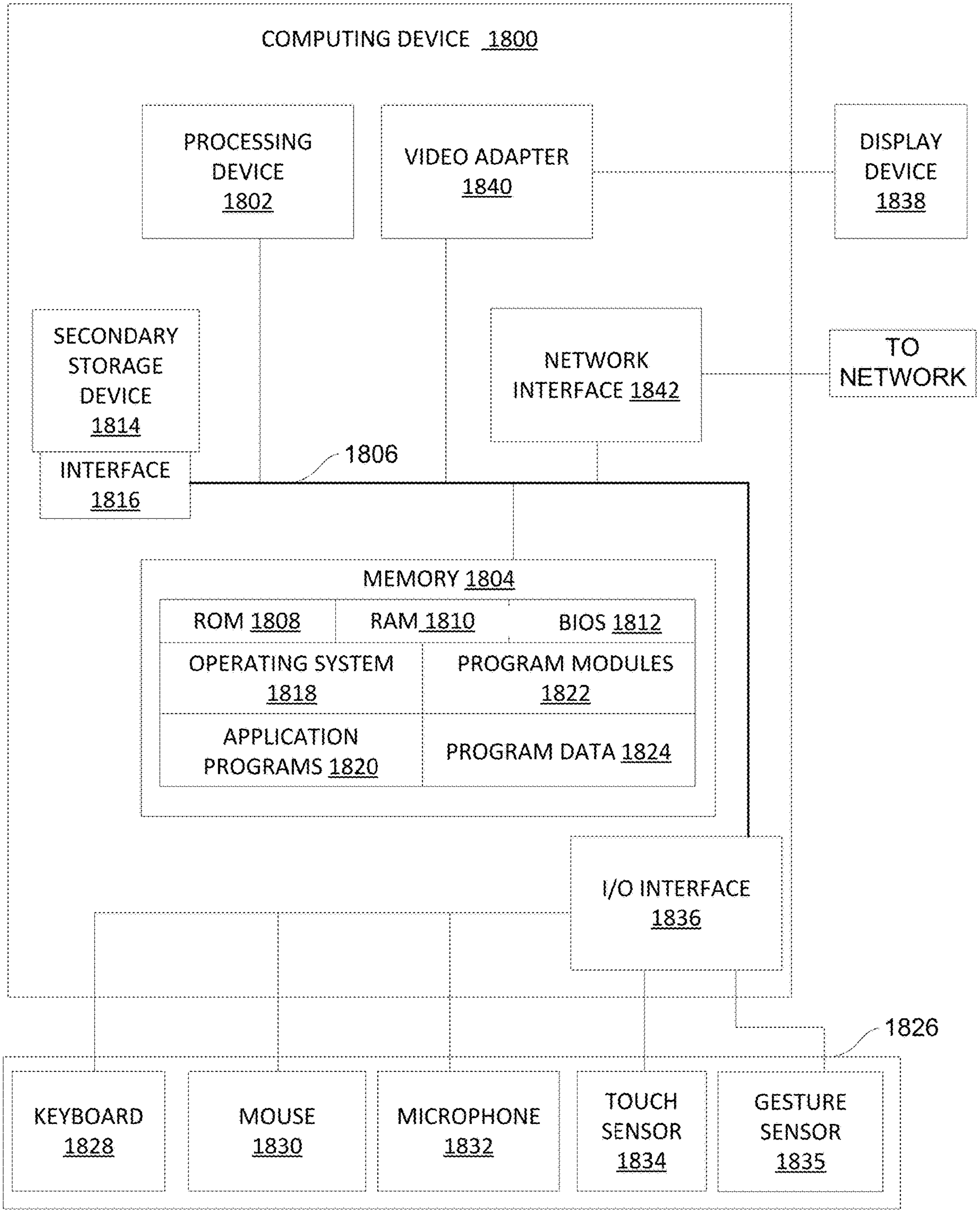
FIG. 18 illustrates an example architecture of a computing device that can be used to implement aspects of the present disclosure.

FIG. 18 illustrates an example architecture of a computing device 1800 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 18 can be used to execute the operating system, application programs, and/or software modules (including the software engines) described herein.

The computing device 1800 includes, in some embodiments, at least one processing device 1802 (e.g., a processor), such as a central processing unit (CPU). A variety of processing devices are available from a variety of manufacturers, for example, Intel or Advanced Micro Devices. In this example, the computing device 1800 also includes a system memory 1804, and a system bus 1806 that interfaces various system components including the system memory 1804 to the processing device 1802. The system bus 1806 is one of any number of types of bus structures that can be used, including, but not limited to, a memory bus, or memory controller; a peripheral bus; and a local bus using any of a variety of bus architectures.

Examples of computing devices that can be implemented using the computing device 1800 include a desktop computer, a laptop computer, a tablet computer, a mobile computing device (such as a smart phone, a touchpad mobile digital device, or other mobile devices), or other devices configured to process digital instructions.

The system memory 1804 includes read only memory 1808 and random access memory 1810. A basic input/output system 1812 containing the basic routines that act to transfer information within computing device 1800, such as during start up, can be stored in the read only memory 1808.

The computing device 1800 also includes a secondary storage device 1814 in some embodiments, such as a hard disk drive, for storing digital data. The secondary storage device 1814 is connected to the system bus 1806 by a secondary storage interface 1816. The secondary storage device 1814 and its associated computer readable media provide non-volatile and non-transitory storage of computer readable instructions (including application programs and program modules), data structures, and other data for the computing device 1800.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 1814 and/or system memory 1804, including an operating system 1818, one or more application programs 1820, other program modules 1822 (such as the software engines described herein), and program data 1824. The computing device 1800 can utilize any suitable operating system.

In some embodiments, a user provides inputs to the computing device 1800 through one or more input devices 1826. Examples of input devices 1826 include a keyboard 1828, mouse 1830, microphone 1832 (e.g., for voice and/or other audio input), touch sensor 1834 (such as a touchpad or touch sensitive display), and gesture sensor 1835 (e.g., for gestural input). In some implementations, the input device(s) 1826 provide detection based on presence, proximity, and/or motion. Other embodiments include other input devices 1826. The input devices can be connected to the processing device 1802 through an input/output interface 1836 that is interfaced to the system bus 1806. These input devices 1826 can be connected by any number of input/output interfaces, such as a parallel port, serial port, game port, or a universal serial bus. Wireless communication between input devices 1826 and the input/output interface 1836 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 1838, such as a monitor, liquid crystal display device, light-emitting diode display device, projector, or touch sensitive display device, is also connected to the system bus 1806 via an interface, such as a video adapter 1840. In addition to the display device 1838, the computing device 1800 can include various other peripheral devices (not shown), such as speakers or a printer.

The computing device 1800 can be connected to one or more networks through a network interface 1842. The network interface 1842 can provide for wired and/or wireless communication. In some implementations, the network interface 1842 can include one or more antennas for transmitting and/or receiving wireless signals. When used in a local area networking environment or a wide area networking environment (such as the Internet), the network interface 1842 can include an Ethernet interface. Other possible embodiments use other communication devices. For example, some embodiments of the computing device 1800 include a modem for communicating across the network.

The computing device 1800 can include at least some form of computer readable media. Computer readable media includes any available media that can be accessed by the computing device 1800. By way of example, computer readable media include computer readable storage media and computer readable communication media.

Computer readable storage media includes volatile and non-volatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1800.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 18 is also an example of programmable electronics, which may include one or more such computing devices, and when multiple computing devices are included, such computing devices can be interfaced together with a suitable data communication network so as to collectively perform the various functions, methods, or operations disclosed herein.

In some implementations, the computing device 1800 can be characterized as an ADAS computer. For example, the computing device 1800 can include one or more components sometimes used for processing tasks that occur in the field of artificial intelligence (AI). The computing device 1800 then includes sufficient proceeding power and necessary support architecture for the demands of ADAS or AI in general. For example, the processing device 1802 can include a multicore architecture. As another example, the computing device 1800 can include one or more co-processors in addition to, or as part of, the processing device 1802. In some implementations, at least one hardware accelerator can be interfaced to the system bus 1806. For example, a graphics processing unit can be used. In some implementations, the computing device 1800 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:

receiving, by at least one processor that performs operations by executing instructions, telemetry data generated by multiple sensors of a vehicle, the multiple sensors arranged to generate the telemetry data regarding at least one first component of the vehicle;

detecting, with multiple failure mode components associated with respective conditions of the at least one first component based on the telemetry data received from the multiple sensors, one or more failure modes of the at least one first component by determining corresponding likelihoods of one or more conditions associated with a respective failure mode component exists, wherein each of the multiple failure mode components is configured to determine a corresponding likelihood that a respective condition exists with regard to the at least one first component;

providing, by the at least one processor, the telemetry data to multiple failure mode components associated with the respective conditions of the at least one first component, wherein each failure mode component includes executable instructions to detect one or more failure modes of the at least one first component by determining the corresponding likelihoods of the one or more conditions associated with the respective failure mode component currently exists, wherein each of the multiple failure mode components is configured to determine the corresponding likelihood that a respective condition exists with regard to the at least one first component;

determining, by the at least one processor and based at least in part on the corresponding likelihoods, a degree of degradation of at least one first system of the vehicle from identification of a first state of the at least one first system of the vehicle, the at least one first system including the at least one first component;

predicting, using the degree of degradation of the at least one first system and application of one or more physics of failure, pattern recognition, trend analysis, extrapolation, interpolation, and probability estimation, i) a state of health (SOH) for the at least one first system, and ii) a remaining useful life (RUL) for the at least one first system, performing, by the at least one processor and based at least in part on the first state, a prognostication that implements a model to predict i) a state of health (SOH) for the at least one first system, and ii) a remaining useful life (RUL) for the at least one first system, wherein the SOH and the RUL are based on the corresponding likelihoods; and identifying a root cause relating to the at least one first component of the vehicle based at least in part on the SOH and the RUL, and performing, by the at least one processor and based at least in part on the SOH and the RUL, at least one action including changing at least one threshold with regard to the at least one first component of the vehicle, wherein performing the at least one action comprises presenting information relating to a fleet of vehicles, the fleet including the vehicle, on a graphical user interface, the information based on the SOH and the RUL, and wherein the graphical user interface is configured for performing a hierarchical drilldown using the identified root cause relating to the at least one first component of the vehicle.

2. The method of claim 1, wherein at least one second system of the vehicle includes the at least one first system, the method further comprising quantifying, by the at least one processor and based at least in part on the corresponding likelihood, a second state of at least one second system.

3. The method of claim 2, wherein performing the prognostication is based at least in part also on the second state.

4. The method of claim 2, wherein performing the at least one action is based at least in part also on the second state.

5. The method of claim 2, wherein the at least one second system corresponds to the vehicle.

6. The method of claim 1, wherein performing the at least one action comprises specifying a maintenance opportunity for the vehicle.

7. The method of claim 6, further comprising extending, after performance of maintenance corresponding to the maintenance opportunity, the at least one threshold for the vehicle, the at least one threshold relating to at least one of the SOH or the RUL.

8. The method of claim 6, wherein specifying the maintenance opportunity comprises selecting a length of time for initiating the maintenance opportunity.

9. The method of claim 1, wherein the information is specific to the vehicle.

10. The method of claim 1, wherein performing the at least one action comprises notifying a service provider about vehicle maintenance.

11. The method of claim 1, wherein performing the at least one action comprises notifying an operator of the vehicle.

12. The method of claim 1, wherein the method is performed using multiple processors, wherein at least one of the multiple processors is located onboard the vehicle, and wherein at least another one of the multiple processors is located in a cloud separate from the vehicle.

13. A system comprising:

a first system component configured to:

receive telemetry data generated by multiple sensors of a vehicle, the multiple sensors arranged to generate the telemetry data regarding at least one first component of the vehicle;

detect, with multiple failure mode components associated with respective conditions of the at least one first component based on the telemetry data received from the multiple sensors, one or more failure modes of the at least one first component by determining corresponding likelihoods of one or more conditions associated with a respective failure mode component exists, wherein each of the multiple failure mode components is configured to determine a corresponding likelihood that a respective condition exists with regard to the at least one first component; and provide the telemetry data to multiple failure mode components associated with the respective conditions of the at least one first component and each failure mode component includes executable instructions to detect one or more failure modes of the at least one first component by determining the corresponding likelihoods of the one or more conditions associated with the respective failure mode component currently exists, wherein each of the multiple failure mode components is configured to determine the corresponding likelihood that a respective condition exists with regard to the at least one first component;

a second system component configured to determine, based at least in part on the corresponding likelihoods, a degree of degradation of at least one first system of the vehicle from identification of a first state of the at least one first system of the vehicle, the at least one first system including the at least one first component; and a third component configured to:

predict, using the degree of degradation of the at least one first system and application of one or more of physics of failure, pattern recognition, trend analysis, extrapolation, interpolation, and probability estimation, i) a state of health (SOH) for the at least one first system, and ii) a remaining useful life (RUL) for the at least one first system, performing, based at least in part on the first state, a prognostication that implements a model to predict i) a state of health (SOH) for the at least one first system, and ii) a remaining useful life (RUL) for the at least one first system, wherein the SOH and the RUL are based on the corresponding likelihoods; and identify a root cause relating to the at least one first component of the vehicle based at least in part on the SOH and the RUL, and perform, based at least in part on the SOH and the RUL, at least one action including changing at least one threshold with regard to the at least one first component of the vehicle, wherein performing the at least one action comprises presenting information relating to a fleet of vehicles, the fleet including the vehicle, on a graphical user interface, the information based on the SOH and the RUL, and wherein the graphical user interface is configured for performing a hierarchical drilldown using the identified root cause relating to the at least one first component of the vehicle.

14. The system of claim 13, wherein an entirety of the system is implemented onboard the vehicle.

15. The system of claim 13, wherein a portion of the system is implemented onboard the vehicle, and wherein a remaining portion of the system is implemented in a cloud separate from the vehicle.

16. The system of claim 13, wherein an entirety of the system is implemented in a cloud separate from the vehicle, and wherein the system receives the telemetry data generated by the multiple sensors by a wireless communication sent from the vehicle to the cloud.

* * * * *